(12) United States Patent
Tsai et al.

(10) Patent No.: US 8,724,235 B2
(45) Date of Patent: May 13, 2014

(54) PHOTOGRAPHING LENS SYSTEM

(75) Inventors: Tsung-Han Tsai, Taichung (TW); Wei-Yu Chen, Taichung (TW)

(73) Assignee: Largan Precision Co., Ltd, Taichung (TW)

( * ) Notice: Subject to any disclaimer, the term of this patent is extended or adjusted under 35 U.S.C. 154(b) by 116 days.

(21) Appl. No.: 13/494,881

(22) Filed: Jun. 12, 2012

(65) Prior Publication Data
US 2013/0208366 A1    Aug. 15, 2013

(30) Foreign Application Priority Data

Feb. 10, 2012 (TW) .............................. 101104408 A

(51) Int. Cl.
*G02B 13/18* (2006.01)
*G02B 9/12* (2006.01)

(52) U.S. Cl.
CPC ..................................... *G02B 13/18* (2013.01)
USPC .......................................... 359/716; 359/784

(58) Field of Classification Search
USPC .......................................... 359/716, 753, 784
See application file for complete search history.

(56) References Cited

U.S. PATENT DOCUMENTS

| 7,525,741 B1 | 4/2009 | Noda |
| 7,564,635 B1 | 7/2009 | Tang |
| 2012/0113529 A1* | 5/2012 | Ko .................................. 359/715 |

* cited by examiner

*Primary Examiner* — William Choi
(74) *Attorney, Agent, or Firm* — Morris Manning & Martin LLP; Tim Tingkang Xia, Esq.

(57) ABSTRACT

A photographing lens system includes, in order from an object side to an image side, a first lens element with positive refractive power including a convex object-side surface and a convex image-side surface, and the object-side surface and the convex image-side surface of the first lens element being aspheric; a second lens element with negative refractive power including a concave object-side surface and a convex image-side surface, and the object-side surface and the image-side surface of the second lens element being aspheric; and a third lens element with negative refractive power including an object-side surface and a concave image-side surface, and the object-side surface and the image-side surface of the third lens element being aspheric. The second lens element and the third lens element are made of plastic. The image-side surface of the third lens element is concave near an optical axis and convex away from the optical axis.

21 Claims, 22 Drawing Sheets

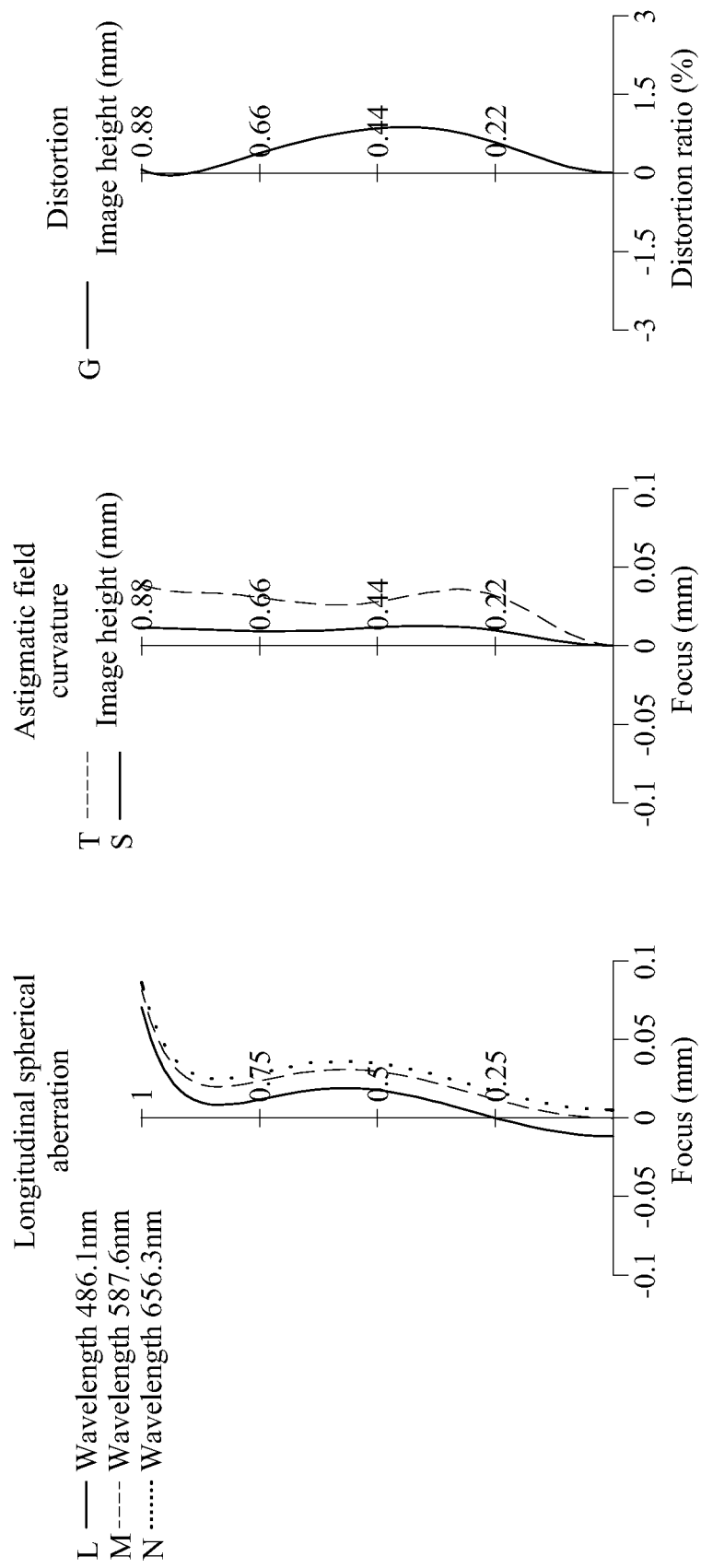

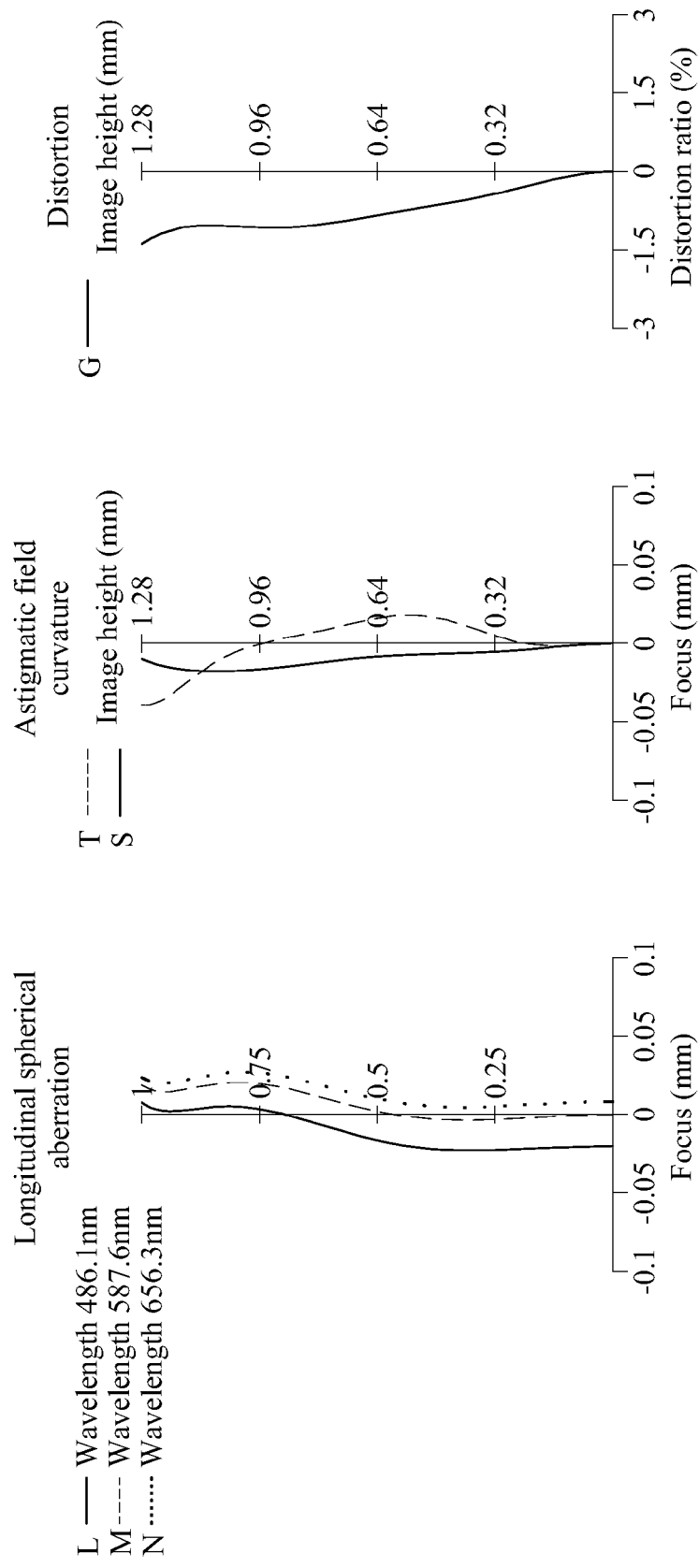

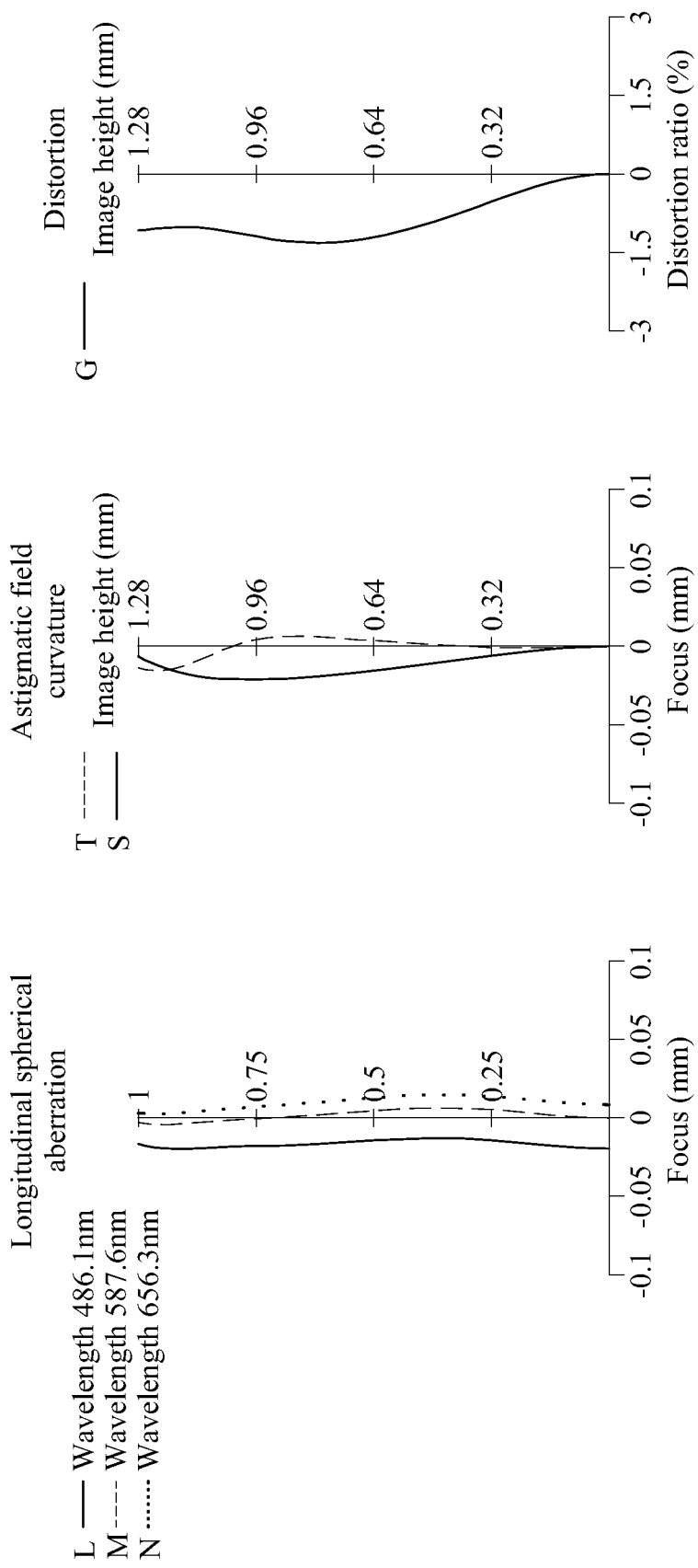

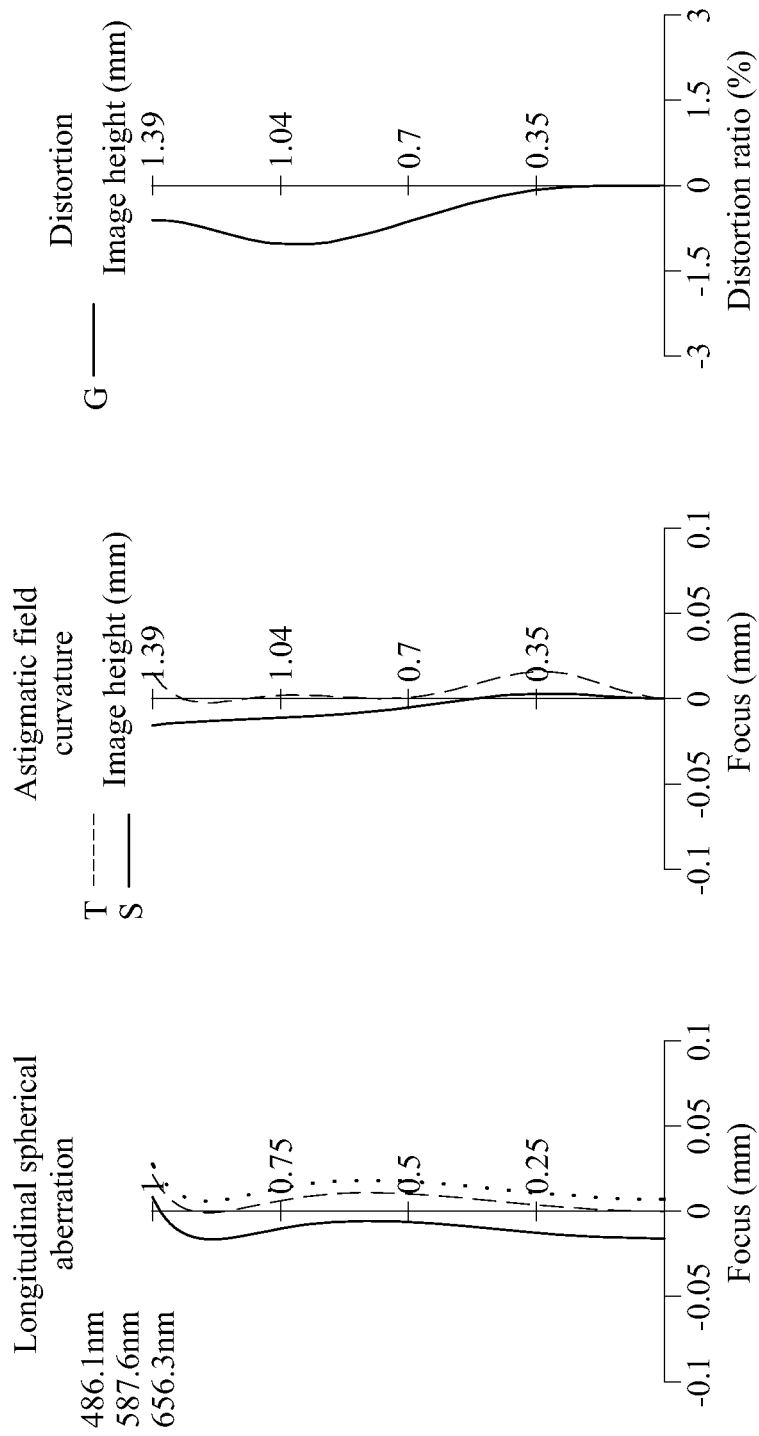

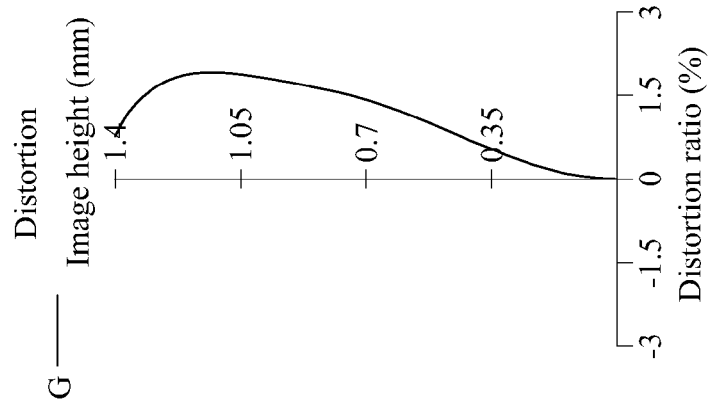
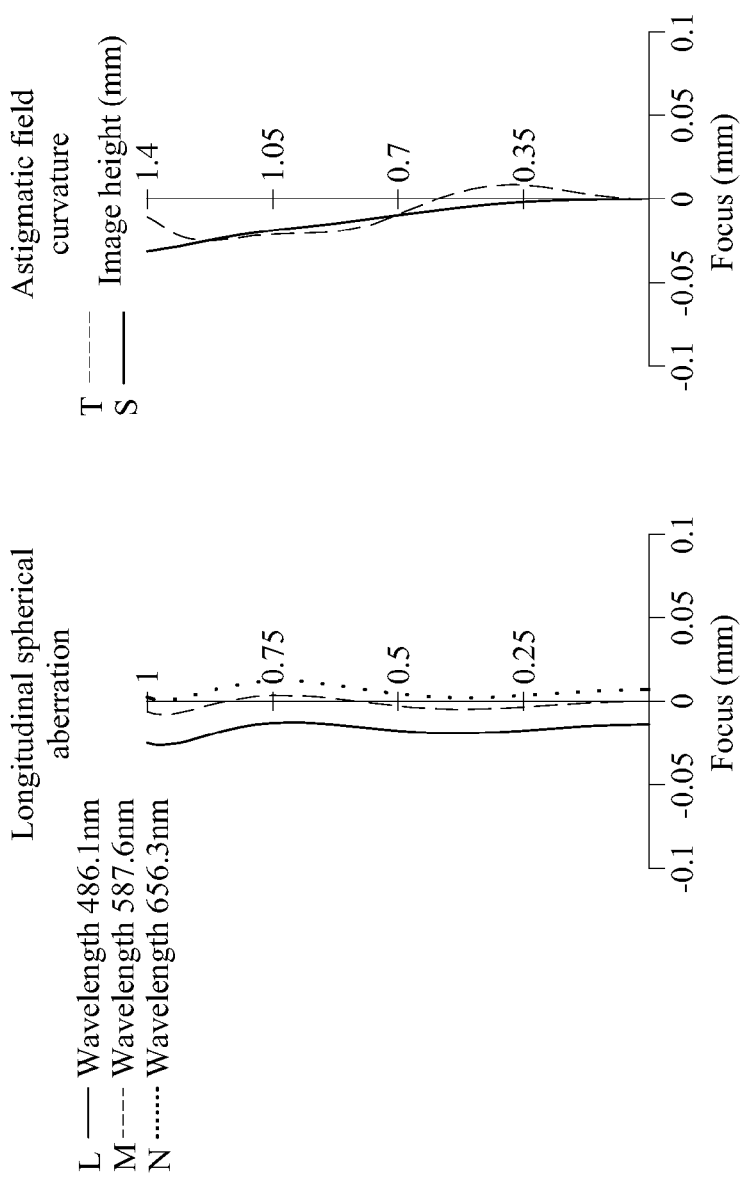
FIG.7B  FIG.7C  FIG.7D

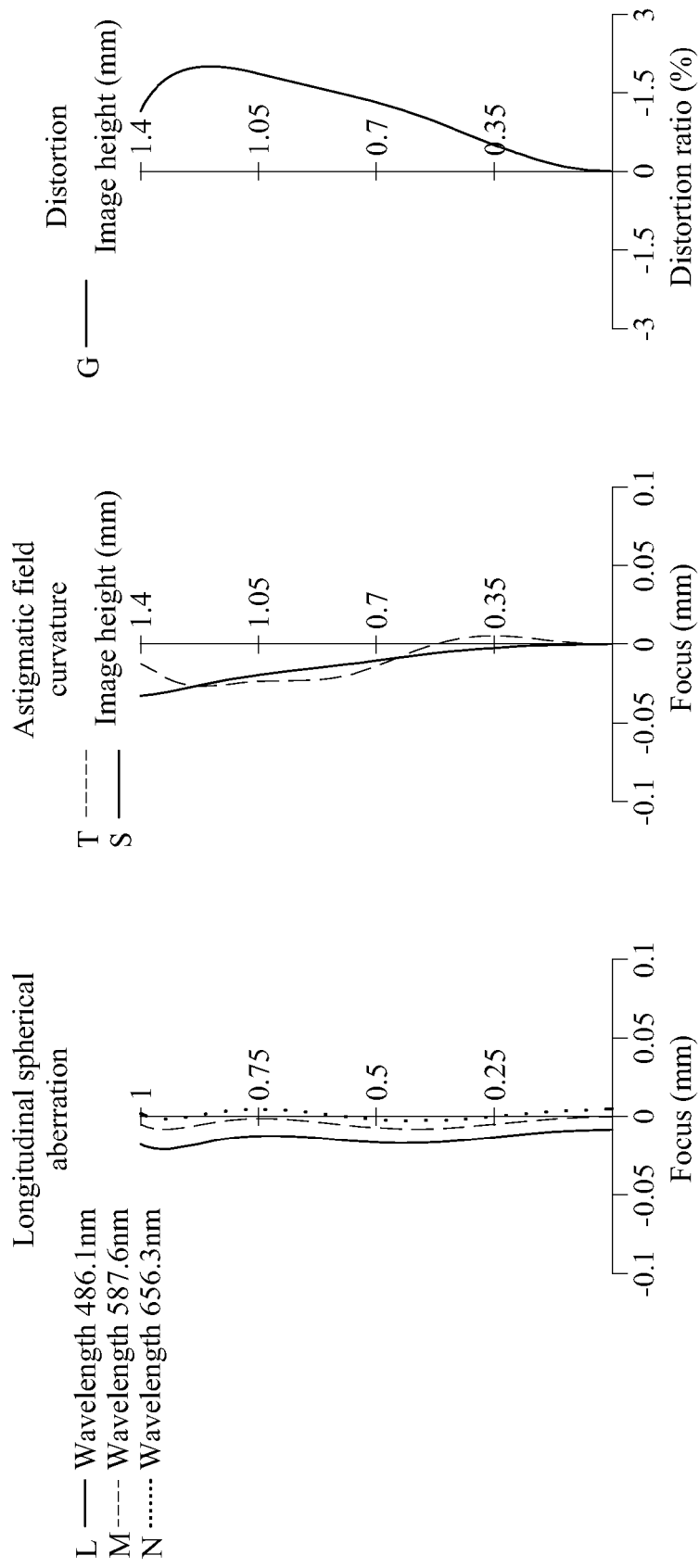

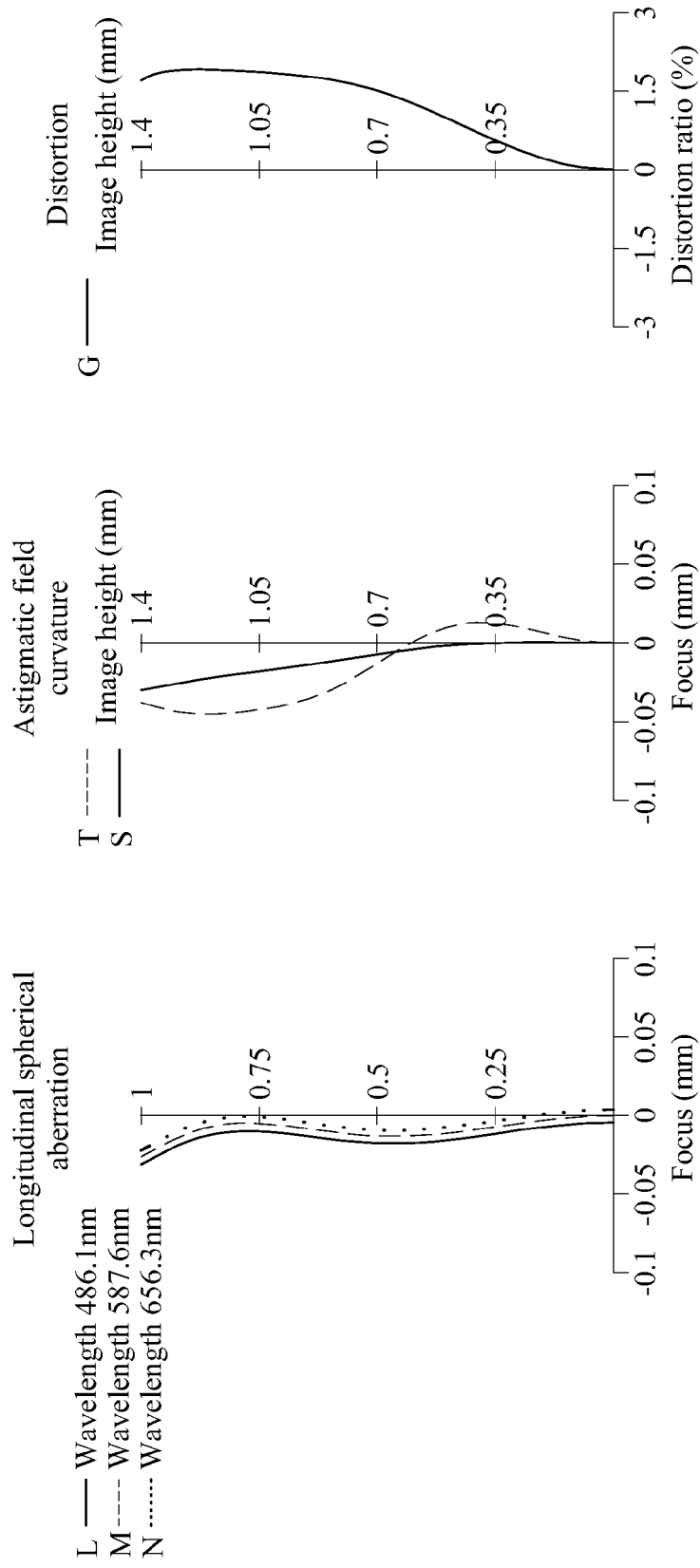

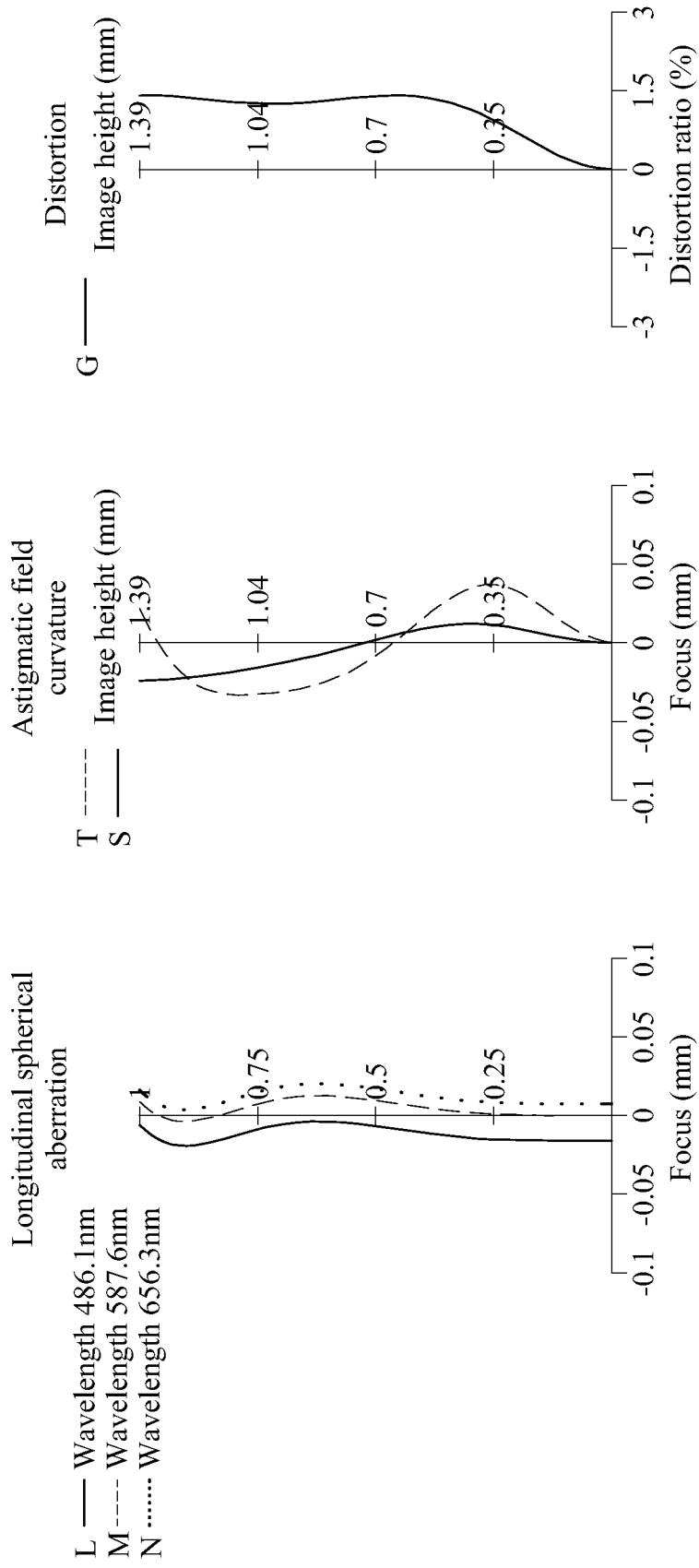

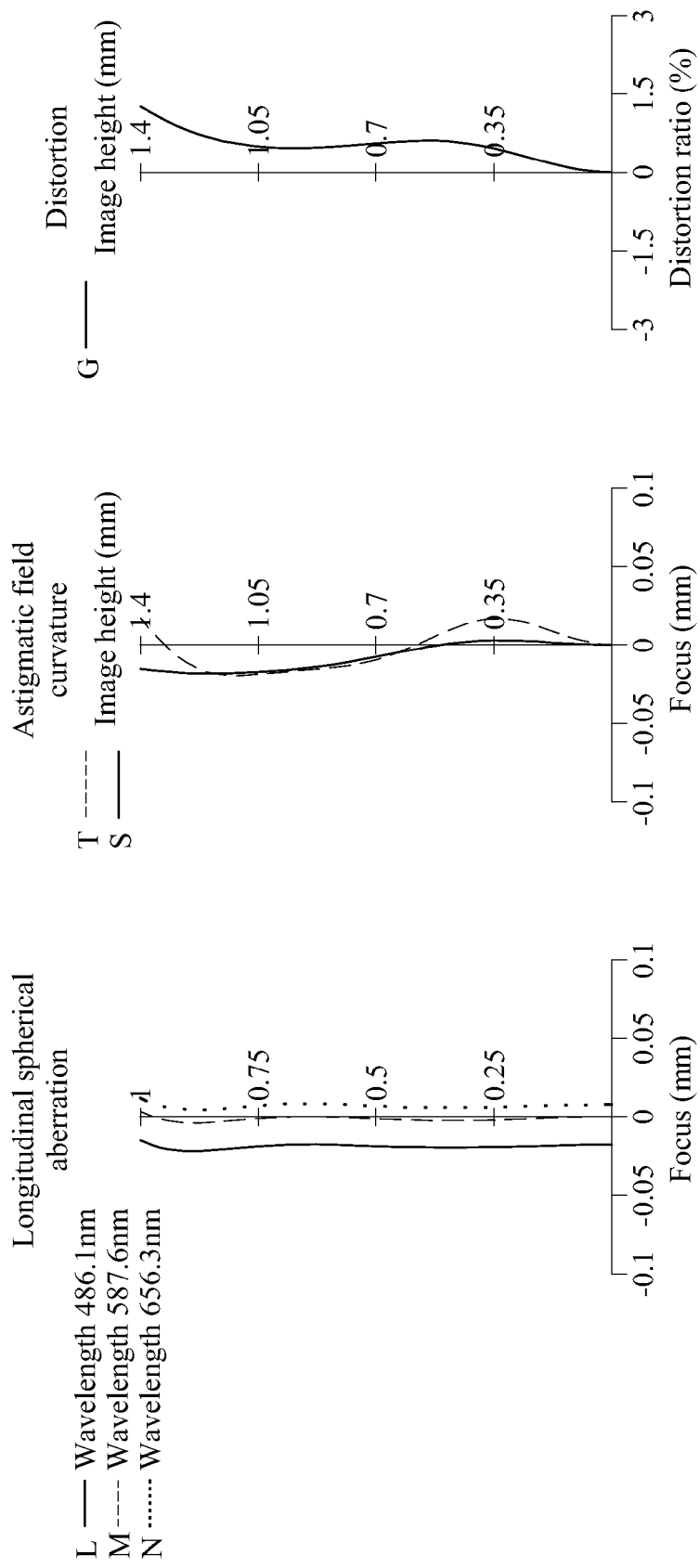

PHOTOGRAPHING LENS SYSTEM

CROSS-REFERENCE TO RELATED APPLICATIONS

This non-provisional application claims priority under 35 U.S.C. §119(a) on Patent Application No(s). 101104408 filed in Taiwan, R.O.C. on Feb. 10, 2012, the entire contents of which are hereby incorporated by reference.

BACKGROUND

1. Technical Field

The present disclosure relates to a photographing lens system, and more particularly to a combined photographing lens system.

2. Related Art

In recent years, with the rise of portable electronic device with photographing capability, the demand for compact photographing module is increased. The photo-sensing device of an ordinary photographing camera is commonly selected from a charge coupled device (CCD) and a complementary metal-oxide semiconductor (CMOS) device. In addition, with the advance of semiconductor manufacturing technology enabling the miniaturization of pixel size of sensors, the resolution of a compact optical lens assembly is gradually increased so there are increasing demands for the compact optical lens assemblies in the limited spacing capable of generating superior imaging quality.

In order to reduce manufacturing costs, a two-lens structure is adopted in a conventional photographic lens assembly. For example, U.S. Pat. No. 7,525,741 discloses a two-piece optical lens system for taking image consisting of two lens elements. However, this lens assembly with only two lens elements having limited aberration correction ability is unfavorable for meeting the demand for high-level photographing module.

In order to improve the imaging quality and miniaturize the overall size, a photographic lens assembly consisting of three lens elements is disclosed. For example, U.S. Pat. No. 7,564,635 discloses an optical lens system for taking image consisting of three lens elements. However, the refractive powers of the three lens elements of the lens assembly are all positive such that it is difficult to correct the aberration (i.e. chromatism) of the lens assembly, therefore, affecting the imaging quality. In view of this, there is a need that a photographing optical lens assembly applicable for compact and portable electronic products has superior imaging quality and an appropriate total length of the lens elements.

SUMMARY

According to an embodiment, a photographing lens system comprises, in order from an object side to an image side, a first lens element with positive refractive power, a second lens element made of plastic with negative refractive power and a third lens element made of plastic with negative refractive power.

The first lens element comprises a convex object-side surface and a convex image-side surface. The object-side surface and the image-side surface are aspheric. The second lens element comprises a concave object-side surface and a convex image-side surface. The object-side surface and the image-side surface are aspheric. The third lens element comprises an object-side surface and a concave image-side surface. The object-side surface and the image-side surface are aspheric. The image-side surface is concave near an optical axis and becomes convex away from the optical axis.

The photographing lens system satisfies the following condition:

$$-0.15 < (R_1 + R_2)/(R_1 - R_2) < 1.00; \text{ and} \qquad \text{(Condition 1)}$$

$$0.70 \text{ millimeters (mm)} < \Sigma CT < 1.56 \text{ mm}. \qquad \text{(Condition 2)}$$

Wherein $R_1$ is the curvature radius of the object-side surface of the first lens element, $R_2$ is the curvature radius of the image-side surface of the first lens element, and $\Sigma CT$ is the total central thickness of the lens elements with refractive powers.

According to another embodiment, a photographing lens system comprises, in order from an object side to an image side, a first lens element with positive refractive power, a second lens element made of plastic with negative refractive power, and a third lens element made of plastic with negative refractive power.

The first lens element comprises a convex object-side surface and a convex image-side surface. The object-side surface and the image-side surface are aspheric. The second lens element comprises a concave object-side surface and a convex image-side surface. The object-side surface and the image-side surface are aspheric. The third lens element comprises a convex object-side surface and a concave image-side surface. The object-side surface and the image-side surface are aspheric. The image-side surface is concave near an optical axis and becomes convex away from the optical axis.

The photographing lens system satisfies the following condition:

$$-0.15 < (R_1 + R_2)/(R_1 - R_2) < 1.00; \text{ and} \qquad \text{(Condition 1)}$$

$$0.15 \text{ mm} < CT_{min} < 0.38 \text{ mm}. \qquad \text{(Condition 3)}$$

Wherein $R_1$ is the curvature radius of the object-side surface of the first lens element; $R_2$ is the curvature radius of the image-side surface of the first lens element, and $CT_{min}$ is the smallest central thickness among the first lens element, the second lens element and the third lens element.

BRIEF DESCRIPTION OF THE DRAWINGS

The present disclosure will become more fully understood from the following detailed description when taken in connection with the accompanying drawings, which show, for purpose of illustrations only, and thus do not limit other possible embodiments derived from the spirit of the present disclosure, and wherein:

FIG. 1B, FIG. 1C, FIG. 1D are schematic views of longitudinal spherical aberration curves, astigmatic field curves, and a distortion curve, respectively in the photographing lens system in FIG. 1A;

FIG. 2B, FIG. 2C, FIG. 2D are schematic views of longitudinal spherical aberration curves, astigmatic field curves, and a distortion curve, respectively in the photographing lens system in FIG. 2A;

FIG. 3B, FIG. 3C, FIG. 3D are schematic views of longitudinal spherical aberration curves, astigmatic field curves, and a distortion curve, respectively in the photographing lens system in FIG. 3A;

FIG. 4B, FIG. 4C, FIG. 4D are schematic views of longitudinal spherical aberration curves, astigmatic field curves, and a distortion curve, respectively in the photographing lens system in FIG. 4A;

FIG. 7B, FIG. 7C, FIG. 7D are schematic views of longitudinal spherical aberration curves, astigmatic field curves, and a distortion curve, respectively in the photographing lens system in FIG. 7A;

FIG. 8B, FIG. 8C, FIG. 8D are schematic views of longitudinal spherical aberration curves, astigmatic field curves, and a distortion curve, respectively in the photographing lens system in FIG. 8A;

FIG. 9B, FIG. 9C, FIG. 9D are schematic views of longitudinal spherical aberration curves, astigmatic field curves, and a distortion curve, respectively in the photographing lens system in FIG. 9A;

FIG. 10B, FIG. 10C, FIG. 10D are schematic views of longitudinal spherical aberration curves, astigmatic field curves, and a distortion curve, respectively in the photographing lens system in FIG. 10A;

FIG. 11B, FIG. 11C, FIG. 11D are schematic views of longitudinal spherical aberration curves, astigmatic field curves, and a distortion curve, respectively in the photographing lens system in FIG. 11A.

DETAILED DESCRIPTION

Figure 1A:
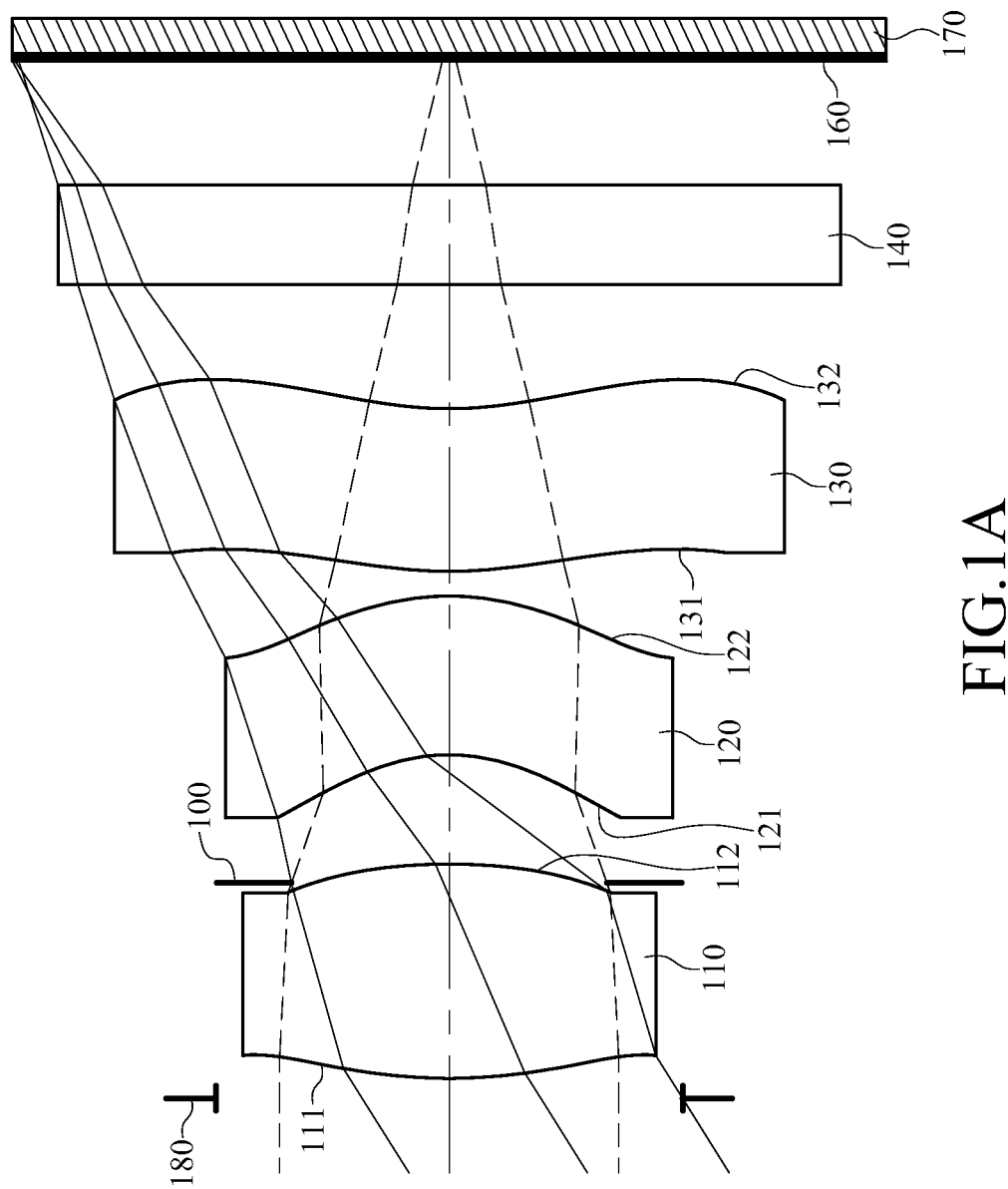
FIG. 1A is a schematic structural view of a first embodiment of a photographing lens system.
Figure 2A:
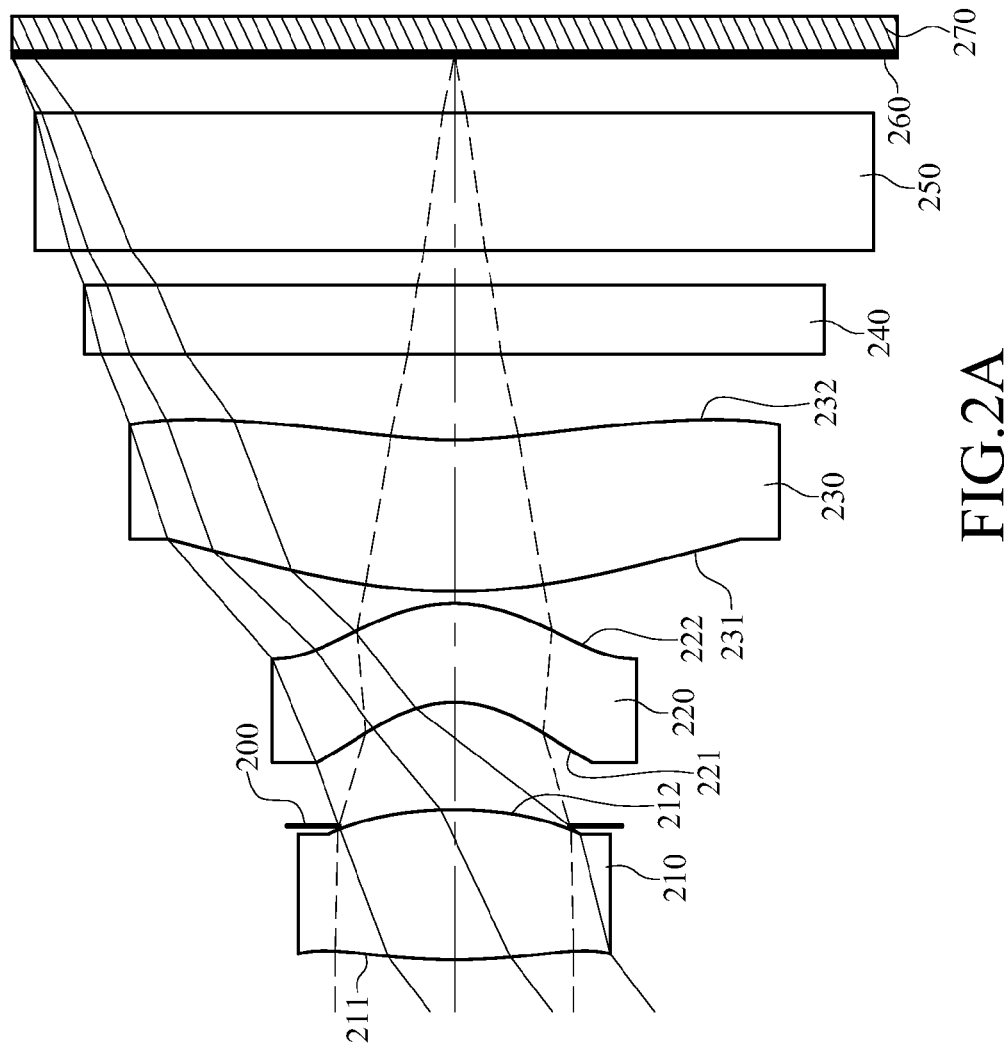
FIG. 2A is a schematic structural view of a second embodiment of a photographing lens system.
Figure 3A:
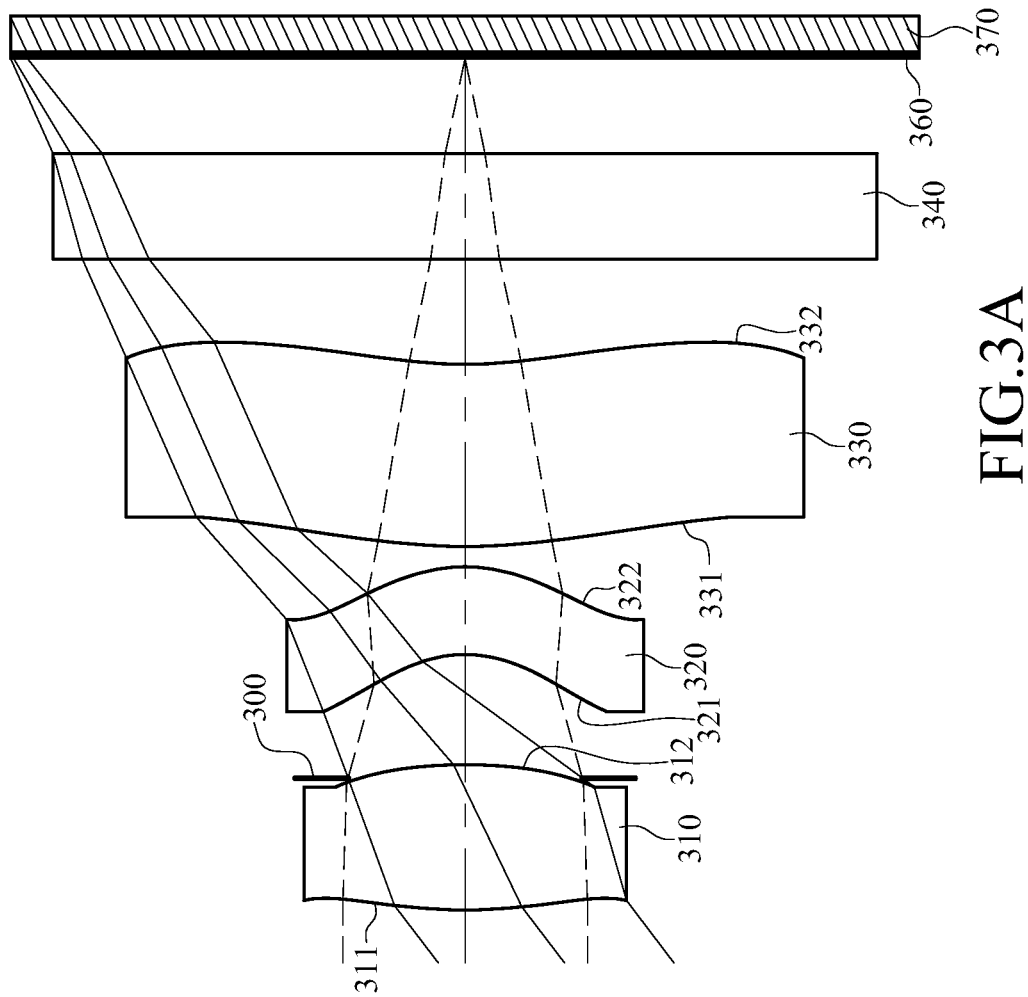
FIG. 3A is a schematic structural view of a third embodiment of a photographing lens system.
Figure 4A:
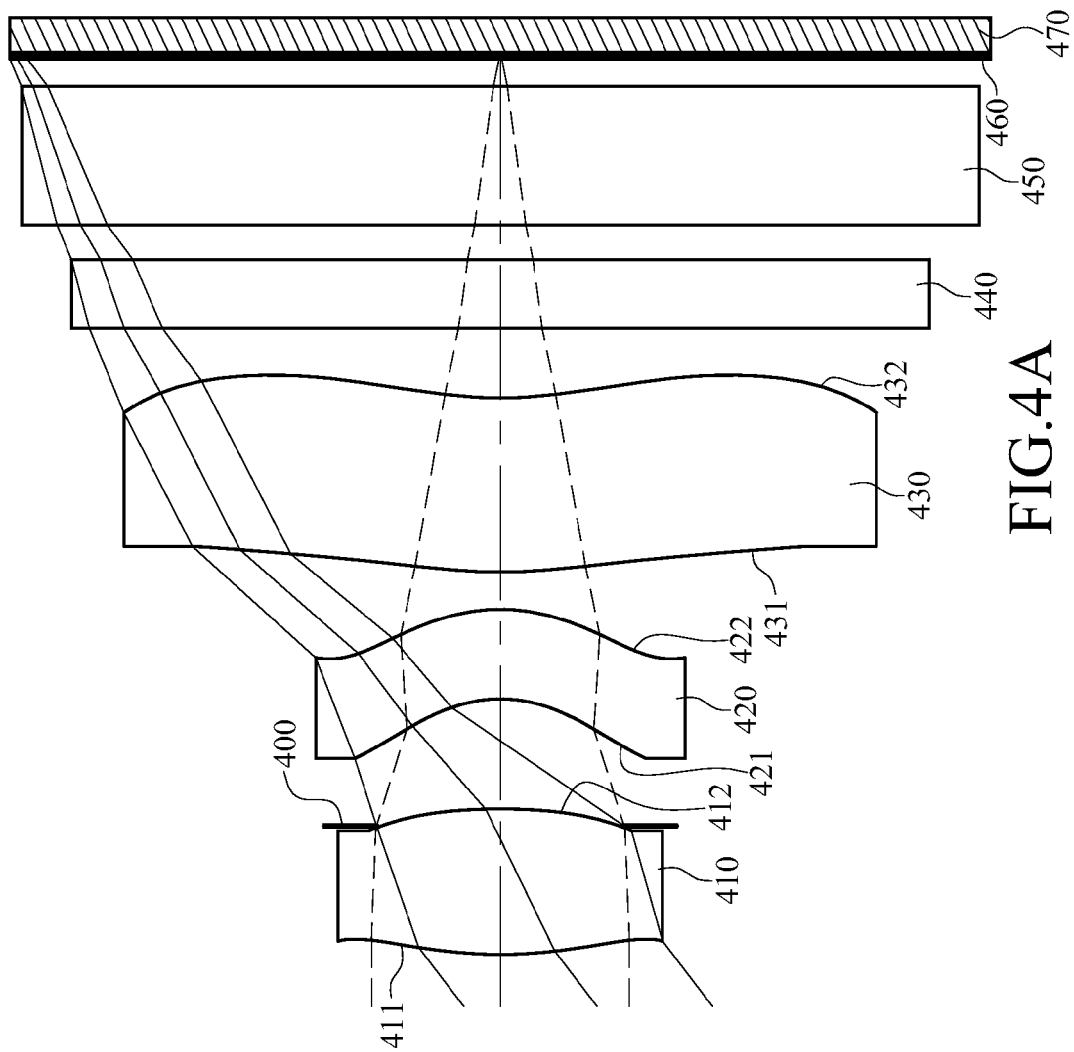
FIG. 4A is a schematic structural view of a fourth embodiment of a photographing lens system.
Figure 5A:
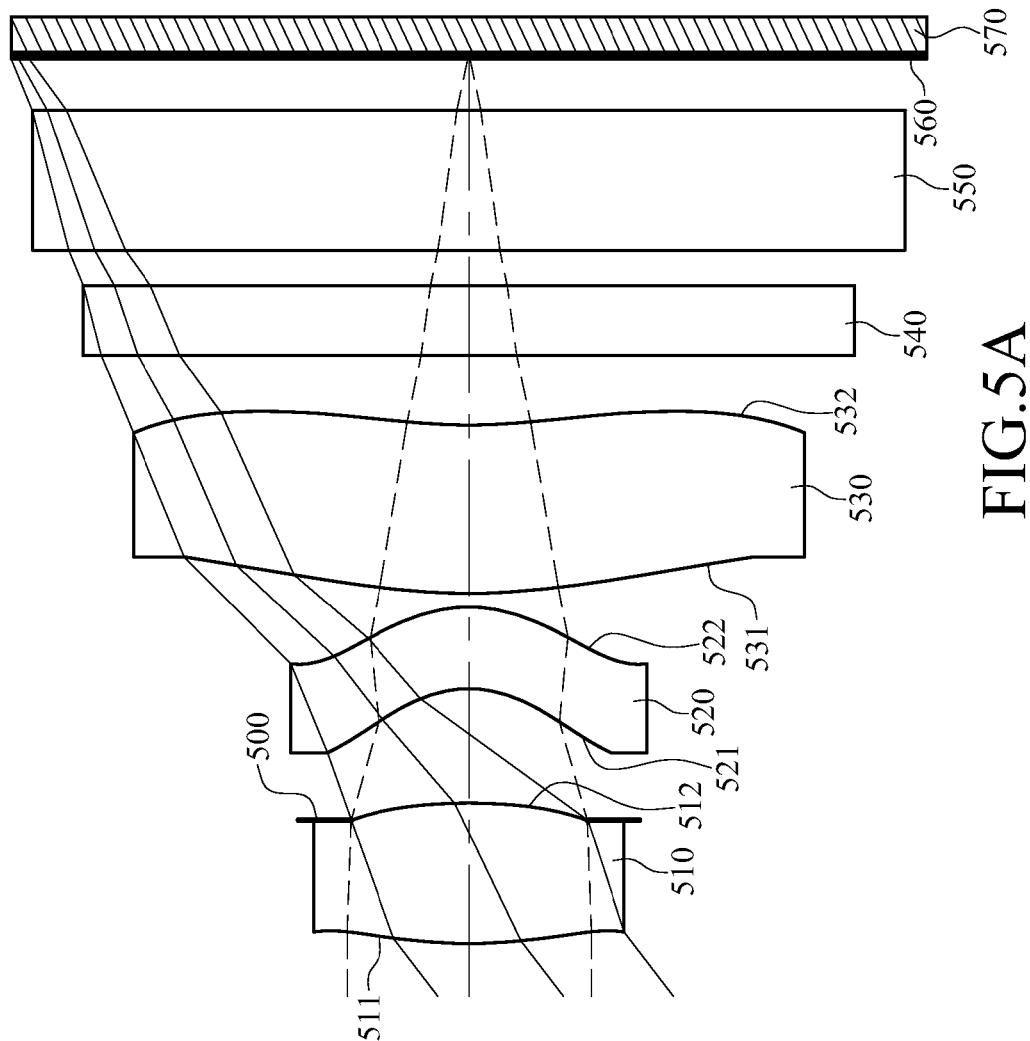
FIG. 5A is a schematic structural view of a fifth embodiment of a photographing lens system.
Figures 5B, 5C, 5D:
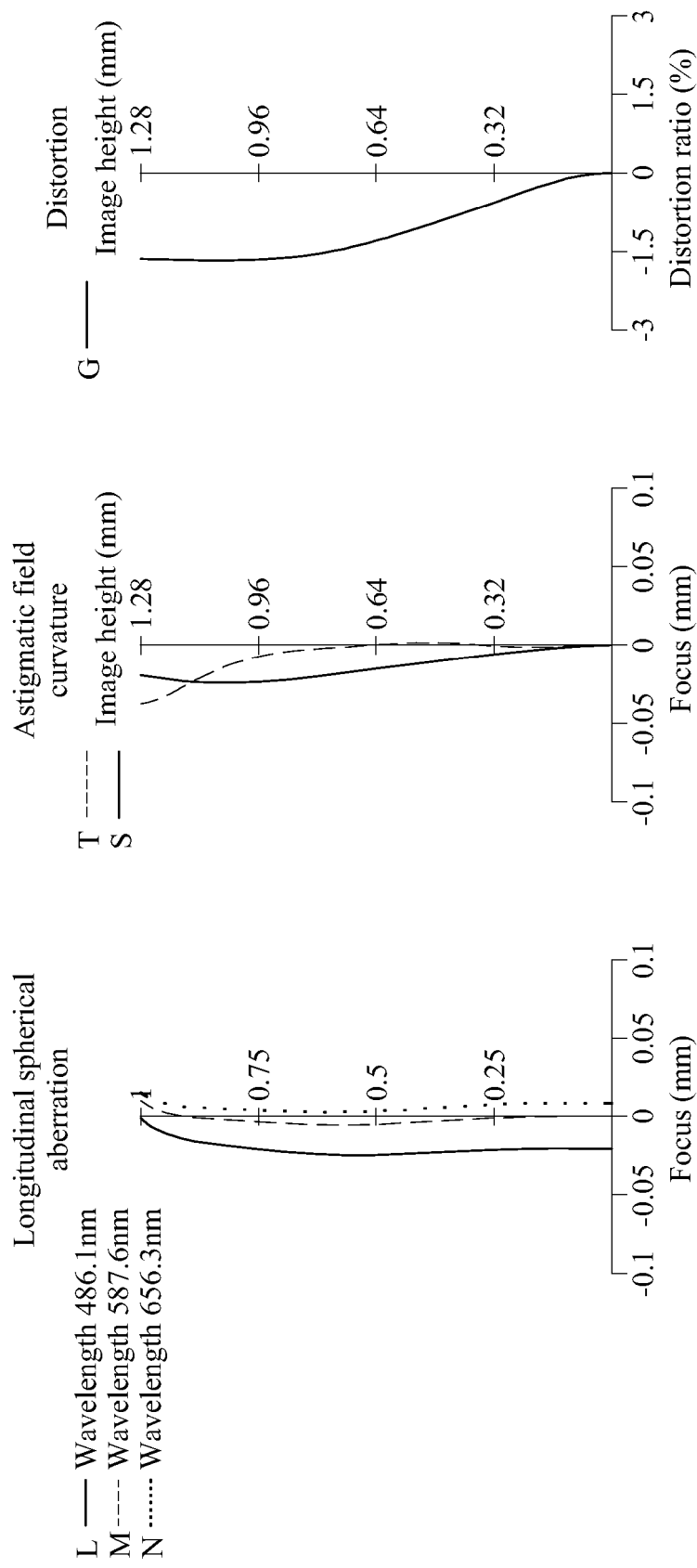
FIG. 5B, FIG. 5C, FIG. 5D are schematic views of longitudinal spherical aberration curves, astigmatic field curves, and a distortion curve, respectively in the photographing lens system in FIG. 5A.
Figure 6A:
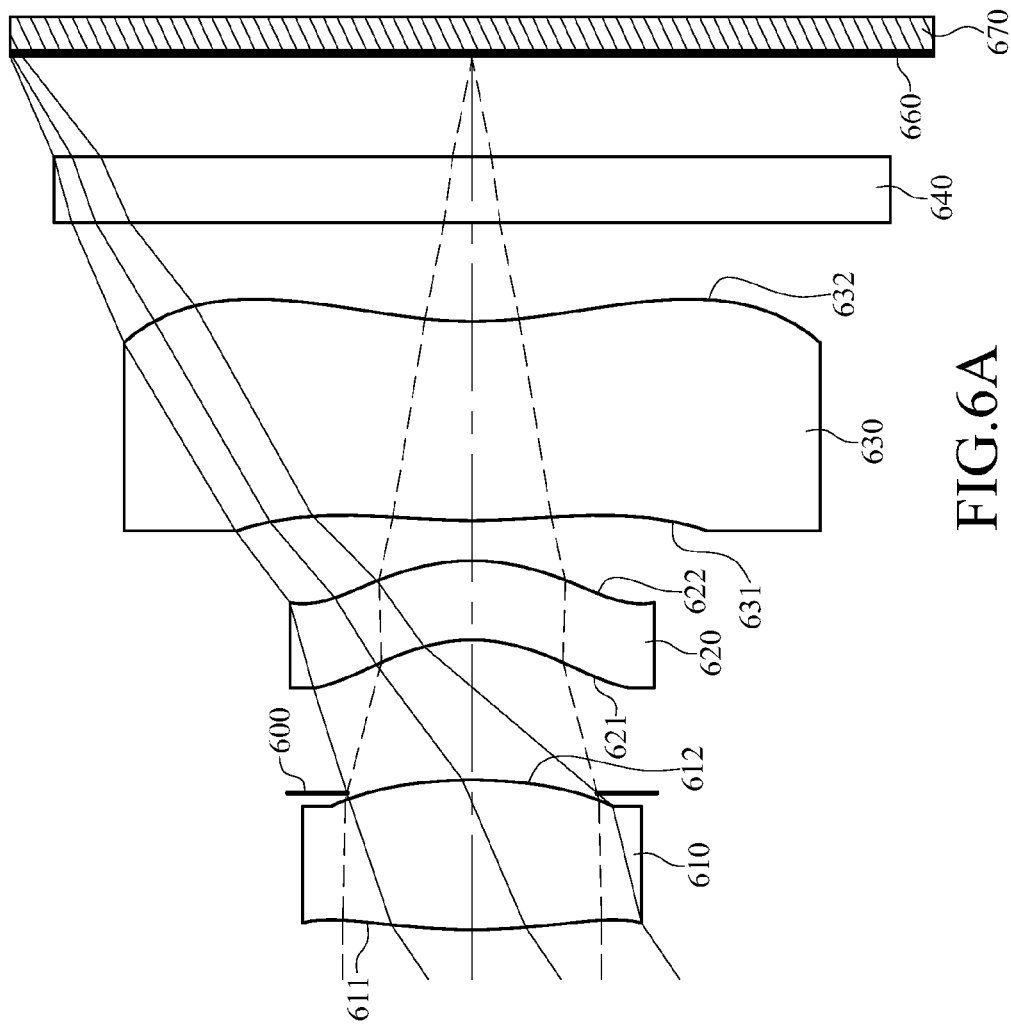
FIG. 6A is a schematic structural view of a sixth embodiment of a photographing lens system.
Figures 6B, 6C, 6D:
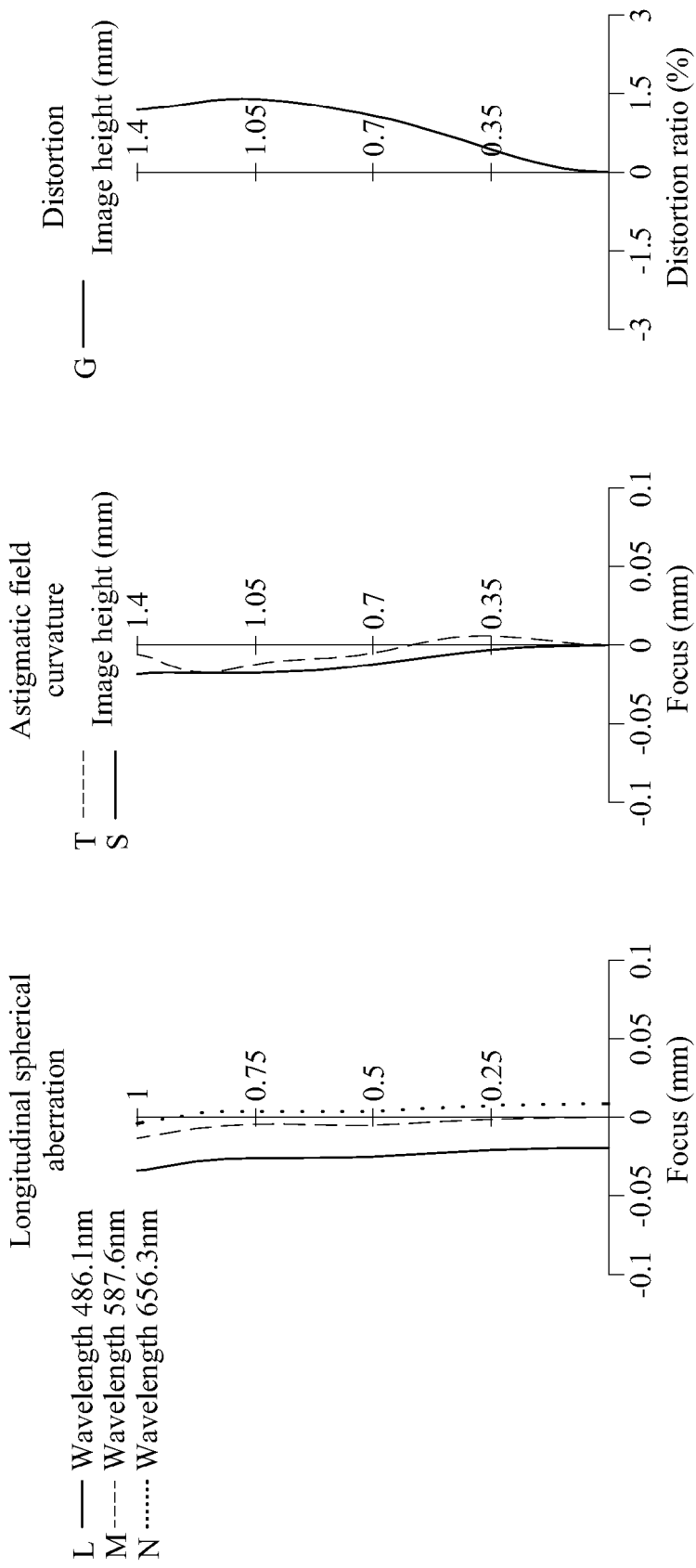
FIG. 6B, FIG. 6C, FIG. 6D are schematic views of longitudinal spherical aberration curves, astigmatic field curves, and a distortion curve, respectively in the photographing lens system in FIG. 6A.
Figure 7A:
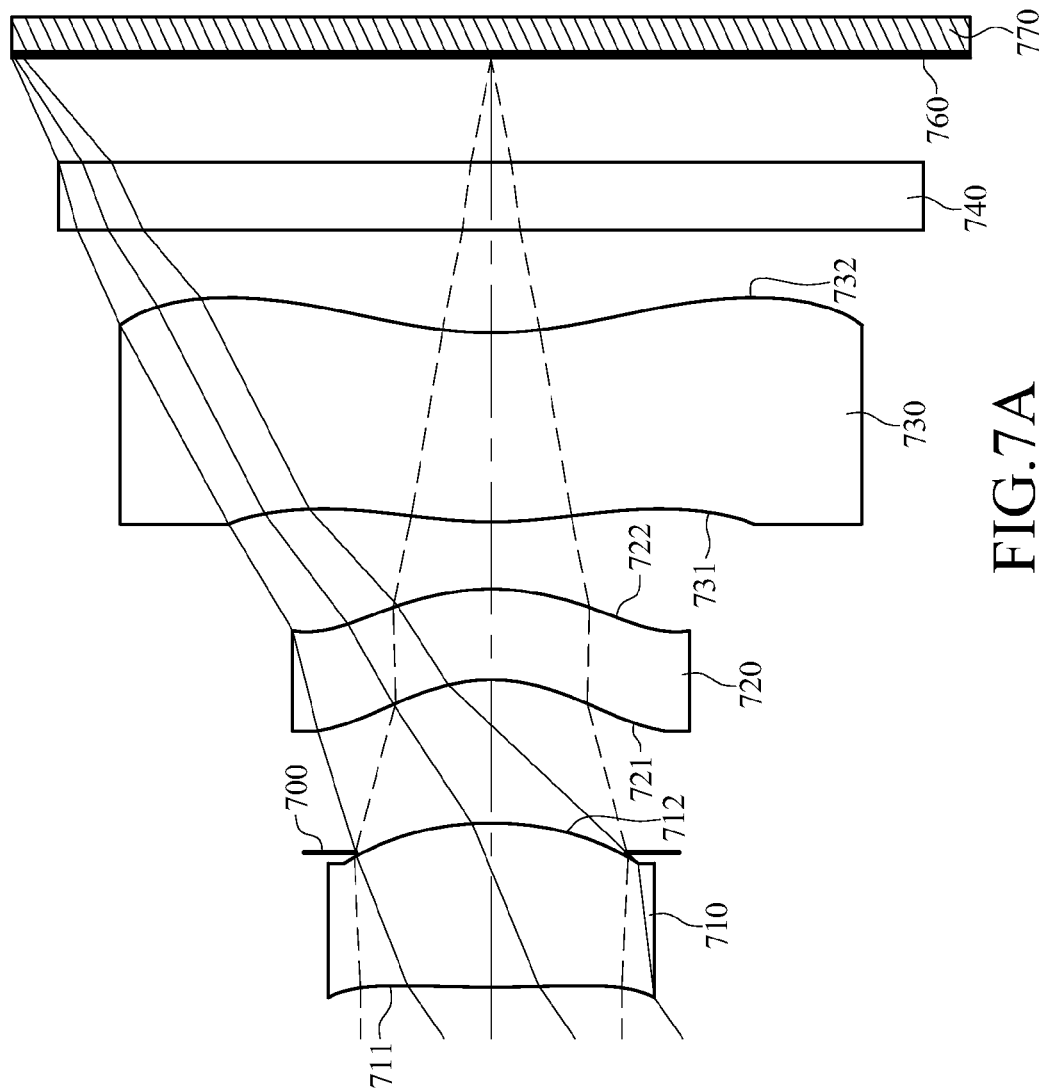
FIG. 7A is a schematic structural view of a seventh embodiment of a photographing lens system.
Figure 8A:
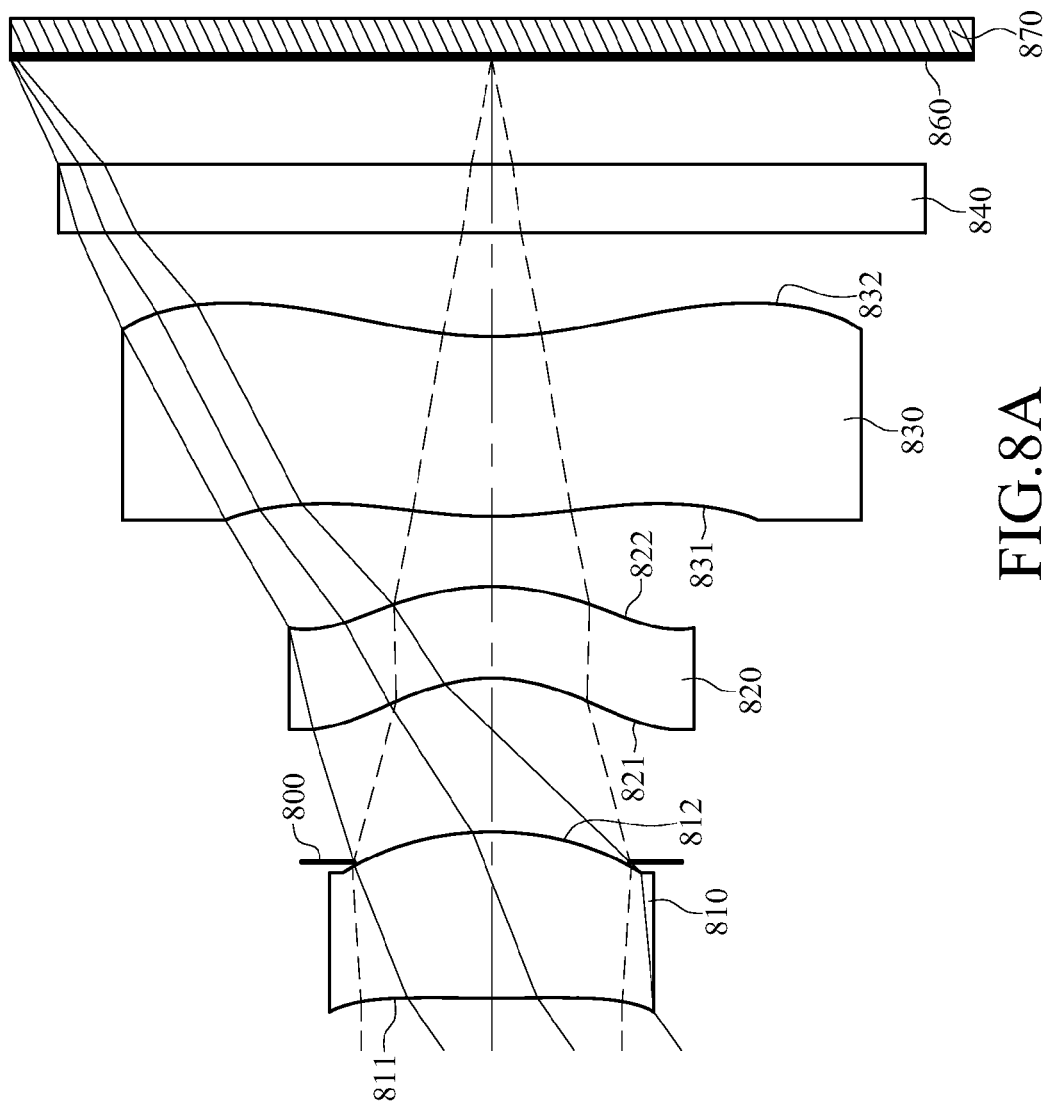
FIG. 8A is a schematic structural view of an eighth embodiment of a photographing lens system.
Figure 9A:
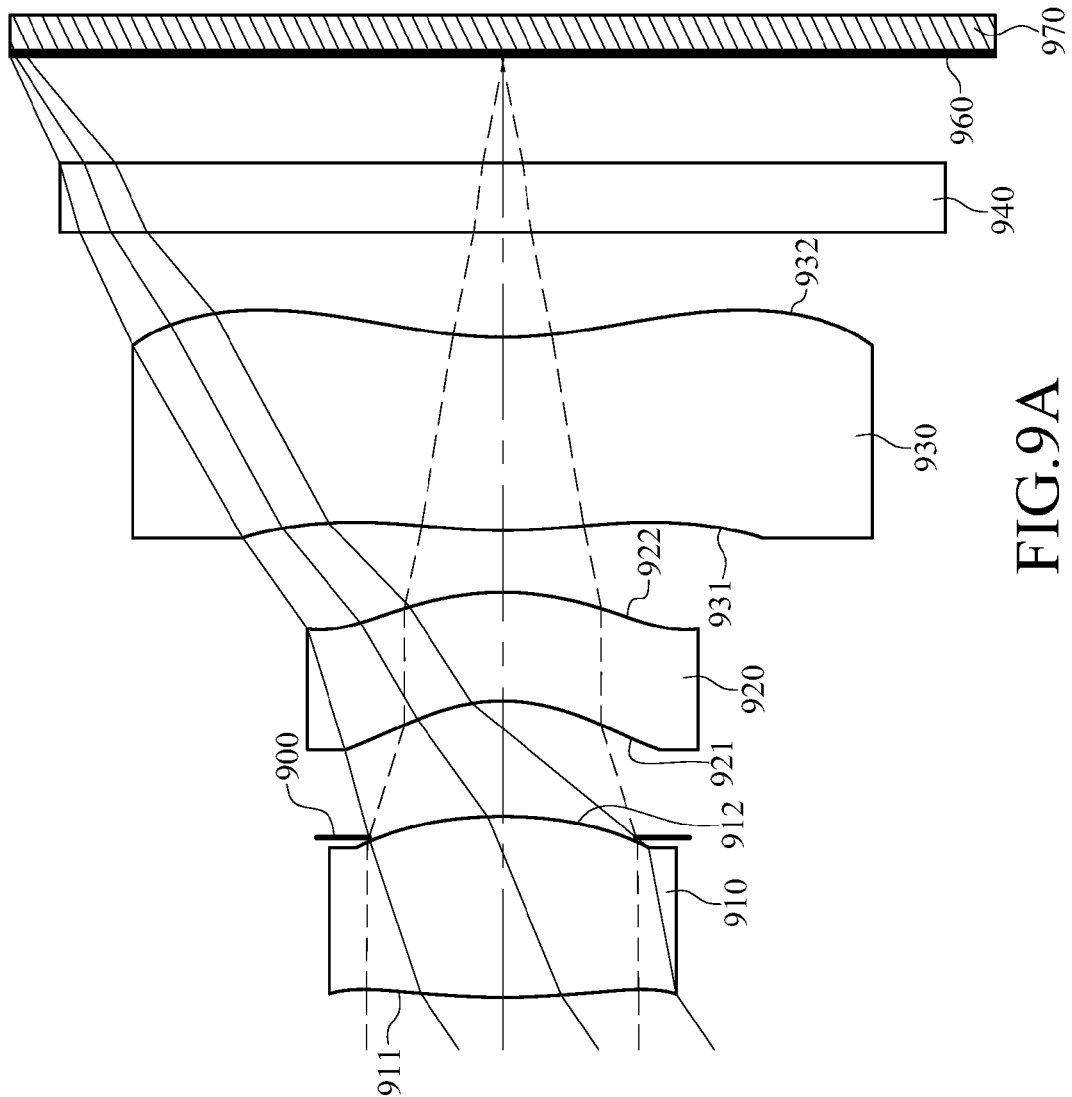
FIG. 9A is a schematic structural view of an ninth embodiment of a photographing lens system.
Figure 10A:
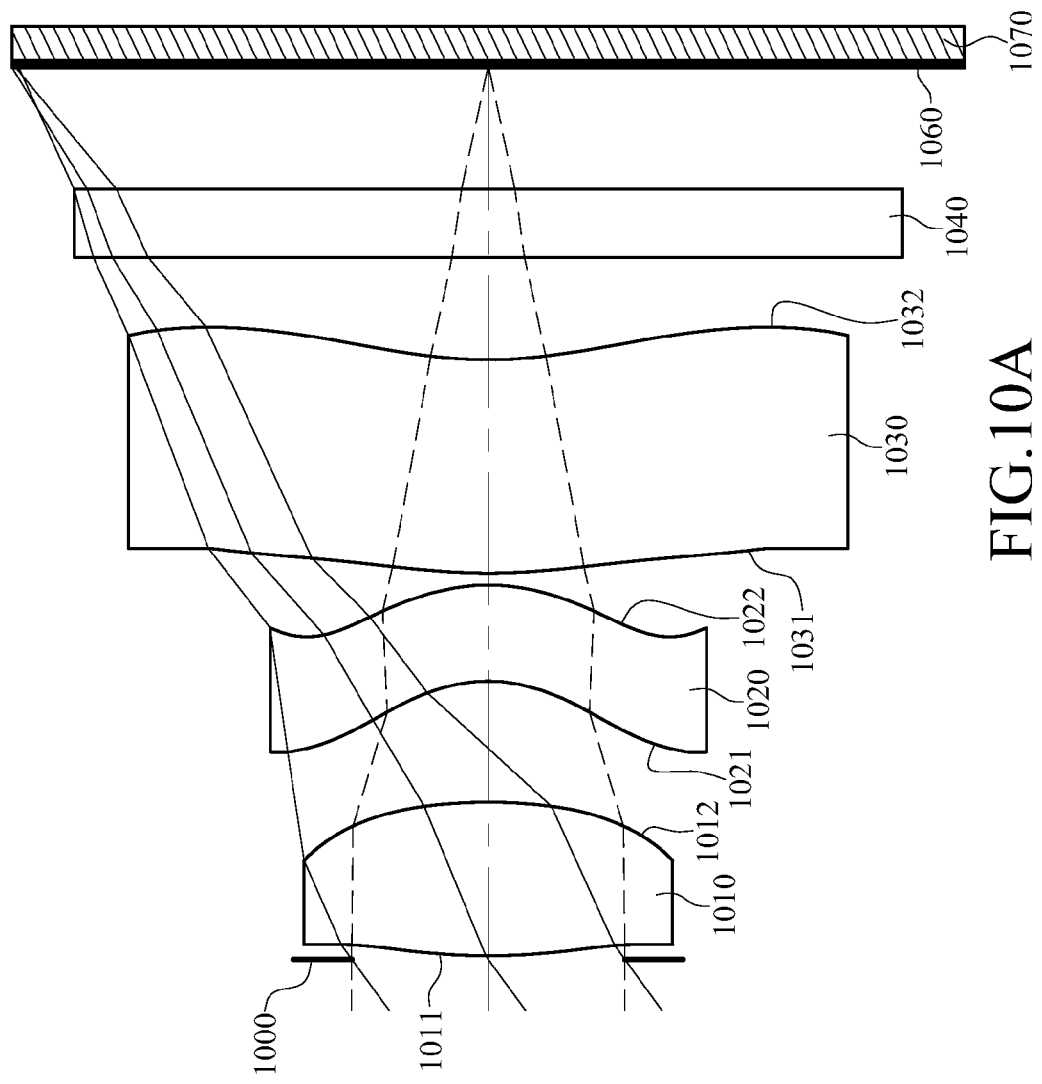
FIG. 10A is a schematic structural view of an tenth embodiment of a photographing lens system.
Figure 11A:
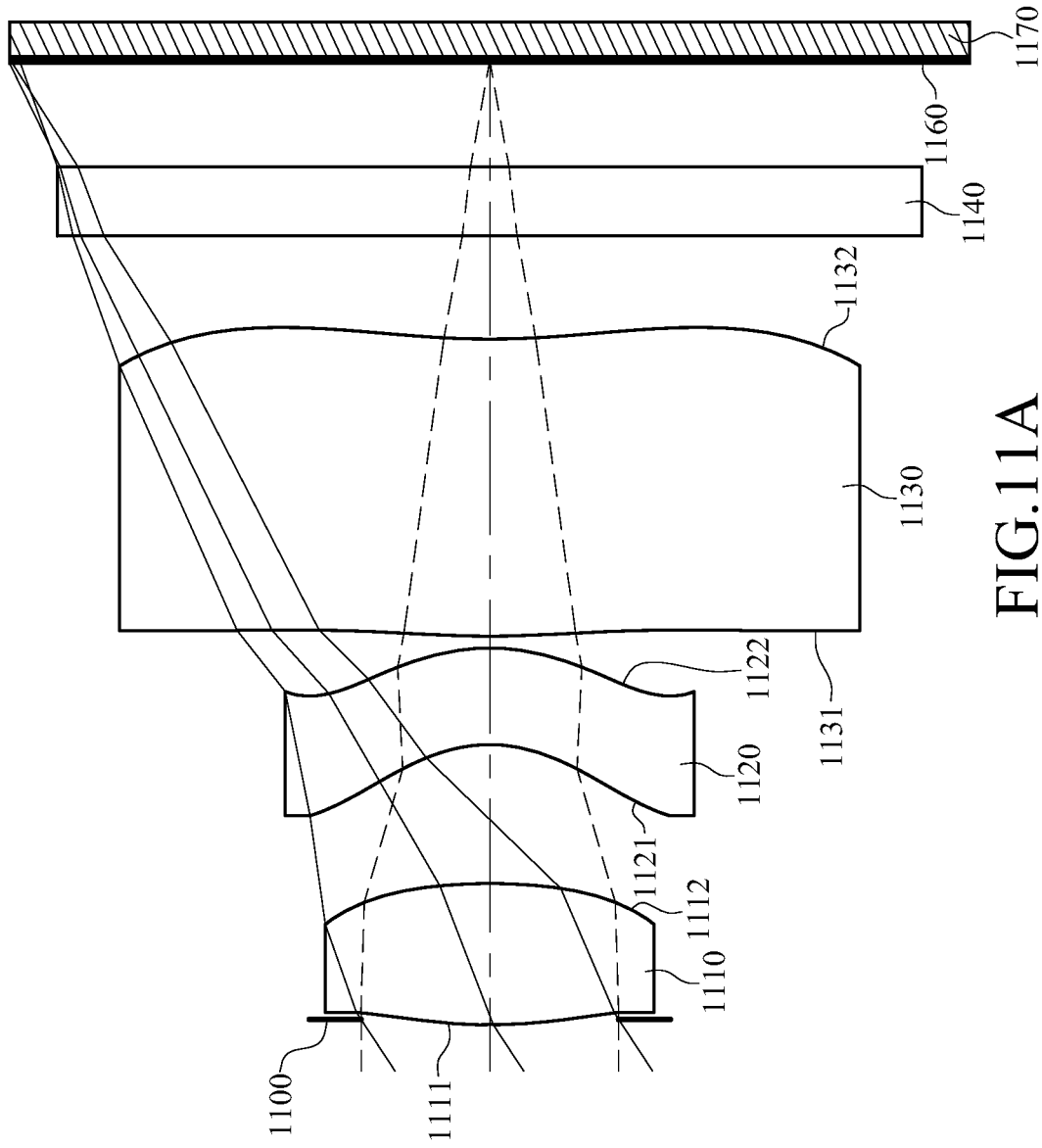
FIG. 11A is a schematic structural view of an eleventh embodiment of a photographing lens system.

The photographing lens system of the present disclosure is described with FIG. 1A as an example to illustrate that the embodiments have similar lens combinations, configuration relationships, and the same conditions of the optical lens assembly. The differences are described in detail in the following embodiments other than the embodiment described in FIG. 1.

Taking FIG. 1A as an example, the photographing lens system 1 comprises, from an object side to an image side along an optical axis (from left to right in FIG. 1A) in sequence, a first lens element 110, a stop, a second lens element 120, a third lens element 130, an IR-cut filter (infrared) 140 and an image sensor 170 disposed on an image plane 160. The stop can be an aperture stop 100. Moreover, along the optical axis, there is an air distance between each lens element 110, 120, 130, respectively.

The first lens element 110 comprises an object-side surface 111 and an image-side surface 112. The refractive power of the first lens element 110 is positive for providing a portion of the overall refractive power needed by the photographing lens system 1 and reducing the total optical length of the photographing lens system 1. Moreover, the object-side surface 111 may be convex, the positive refractive power of the first lens element 110 is further enhanced which enables the total optical length of the photographing lens system 1 being even shorter.

The second lens element 120 comprises an object-side surface 121 and an image-side surface 122. The refractive power of the second lens element 120 is negative for correcting the aberration of the photographing lens system 1.

The third lens element 130 comprises an object-side surface 131 and an image-side surface 132. The object-side surface 131 is convex and the image-side surface 132 is concave for correcting the high order aberration of the photographing lens system 1, therefore, enhancing the imaging quality of the photographing lens system 1. The image-side surface 132 is concave near the optical axis and becomes convex away from the optical axis. The refractive power of the third lens element 130 is negative for effectively correcting the Petzval Sum of the photographing lens system 1.

The photographing lens system 1 satisfies the following conditions:

| | |
|---|---|
| $-0.15<(R_1+R_2)/(R_1-R_2)<1.00;$ | (Condition 1) |
| $0.70 \text{ mm}<\Sigma CT<1.56 \text{ mm; and}$ | (Condition 2) |
| $0.15 \text{ mm}<CT_{min}<0.38 \text{ mm}.$ | (Condition 3) |

Wherein $R_1$ is the curvature radius of the object-side surface 111 of the first lens element 110; $R_2$ is the curvature radius of the image-side surface 112 of the first lens element 110; $\Sigma CT$ is the total central thickness of the lens elements 110, 120, 130 with refractive powers; and $CT_{min}$ is the smallest central thickness among the first lens element 110, the second lens element 120 and the third lens element 130.

When Condition 1 is satisfied, the refractive power of the photographing lens system 1 is well allocated, the total optical length of the photographing lens system 1 is reduced, the spherical aberration is corrected and a superior imaging quality is obtained. In some embodiments, the first lens element 110 satisfies $0 \le (R_1+R_2)/(R_1-R_2)<0.90$. When Condition 2 is satisfied, the miniaturization of the photographing lens system 1 is maintained. When Condition 3 is satisfied, the miniaturization of the photographing lens system 1 is further enhanced. In some embodiments, the first lens element 110, the second lens element 120 and the third lens element 130 satisfy $0.15 \text{ mm}<CT_{min}<0.32 \text{ mm}$.

Furthermore, the photographing lens system 1 satisfies the following conditions:

| | |
|---|---|
| $-10.0<(R_3+R_4)/(R_3-R_4)<-4.5;$ | (Condition 4): |
| $-0.20<f_1/f_3<-0.01;$ | (Condition 5): |
| $0.25 \text{ mm}<CT_{max}<0.90 \text{ mm};$ | (Condition 6): |
| $10<V_2<24;$ | (Condition 7): |
| $0.70<SL/TTL<1.02;$ | (Condition 8): |
| $0.56<R_6/f<1.30;$ and | (Condition 9): |
| $0.8 \text{ mm}<TD<2.4 \text{ mm}.$ | (Condition 10): |

Wherein $R_3$ is the curvature radius of the object-side surface 121 of the second lens element 120; $R_4$ is the curvature radius of the image-side surface 122 of the second lens element 120; $f_1$ is the focal length of the first lens element 110; $f_3$ is the focal length of the third lens element 130; $CT_{max}$ is the largest central thickness among the first lens element 110, the second lens element 120 and the third lens element 130; $V_2$ is the Abbe number of the second lens element 120; SL is the axial distance between the stop 110 and the image plane 160; TTL is the axial distance between the object-side surface 111 of the first lens element 110 and the image plane 160; $R_6$ is the curvature radius of the image-side surface 132 of the third lens element 130; f is the focal length of the photographing lens system 1; and TD is the axial distance between the object-side surface 111 of the first lens element 110 and the image-side surface 132 of the third lens element 130.

When Condition 4 is satisfied, the lens shape of the second lens element 120 is favorable for correcting the astigmatism of the photographing lens system 1. When Condition 5 is satisfied, an allocation of the refractive powers of the first lens element 110 and the third lens element 130 is balanced to reduce the generation of the aberration. When Condition 6 is satisfied, the miniaturization of the photographing lens system 1 is further enhanced. Satisfying Condition 7 is favorable for correcting the chromatism of the photographing lens system 1. When Condition 8 is satisfied, a better balance between the telecentric characteristic and the wide-viewing angle is obtained. In some embodiments, the photographing lens system 1 satisfies 0.70<SL/TTL<0.90. Satisfying Condition 9 is favorable for making the principal point of the photographing lens system 1 farther away from the image plane 160, and, therefore, reducing the total optical length of the photographing lens system 1 as well as maintaining the miniaturization of the photographing lens system 1. Satisfying Condition 10 is favorable for the miniaturization of the photographing lens system 1.

In addition, in the photographing lens system 1, a convex surface means the surface at a paraxial site is convex; a concave surface means the surface at a paraxial site is concave.

Furthermore, for eliminating the stray light to improve the imaging quality or limiting the object image to a desirable size, at least one stop, such as a glare stop or field stop, may be disposed.

As for the photographing lens system 1, the specific schemes are further described with the following embodiments. Parameters in the embodiments are defined as follows.

Fno is an f-number value of the photographing lens system 1, and HFOV is a half of maximal field of view in the photographing lens system 1. The aspheric surface in the embodiments may be represented by, but not limited to, the following aspheric surface equation (Formula ASP):

$$X(Y) = (Y^2/R)/(1 + sqrt(1 - (1+k)*(Y/R)^2)) + \sum_{i}(Ai)*(Y^i)$$

Wherein X is the distance of a point on the aspheric surface at a distance Y away from the optical axis relative to the tangential plane at the aspheric surface vertex, Y is the distance from the point on the curve of the aspheric surface to the optical axis, k is a conic factor, Ai is an $i^{th}$ order aspheric surface coefficient, and in the embodiments, i may be, but is not limited to, 2, 3, 4, 5, 6, 7 and 8.

The First Embodiment (Embodiment 1)

Referring to FIGS. 1A to 1D, the photographing lens system 1 comprises, from an object side to an image side along an optical axis (from left to right in FIG. 1A) in sequence, a stop 180, a first lens element 110, an aperture stop 100, a second lens element 120, a third lens element 130, an IR-cut filter (infrared) 140 and an image sensor 170 disposed on an image plane 160. Moreover, along the optical axis, there is an air distance between each lens element 110, 120, 130, respectively.

In this embodiment, the first lens element 110 with positive refractive power has a convex object-side surface 111 and a convex image-side surface 112. The second lens element 120 with negative refractive power has a concave object-side surface 121 and a convex image-side surface 122. The third lens element 130 with negative refractive power has a convex object-side surface 131 and a concave image-side surface 132.

In this embodiment, the reference wavelength of the incident light ray in the photographing lens system 1 is 587.6 nm. However, the reference wavelength of the light does not intend to limit the disclosure. In some embodiments, light with different wavelength can be utilized for demonstrations of different purposes.

The detailed data of the photographing lens system 1 is as shown in Table 1-1 below:

TABLE 1-1

Embodiment 1
f = 1.38 mm, Fno = 2.02, HFOV = 32.1 deg.

| Surface # | | Curvature radius (mm) | Thickness (mm) | Material | Index | Abbe # | Focal length (mm) |
|---|---|---|---|---|---|---|---|
| 0 | Object | Plano | Infinity | | | | |
| 1 | Stop | Plano | 0.040 | | | | |
| 2 | Lens 1 | 1.063020 (ASP) | 0.432 | Plastic | 1.544 | 55.9 | 1.10 |
| 3 | | −1.179390 (ASP) | −0.038 | | | | |
| 4 | Ape. Stop | Plano | 0.258 | | | | |
| 5 | Lens 2 | −0.385950 (ASP) | 0.320 | Plastic | 1.632 | 23.4 | −12.11 |
| 6 | | −0.536960 (ASP) | 0.050 | | | | |
| 7 | Lens 3 | 0.936200 (ASP) | 0.328 | Plastic | 1.544 | 55.9 | −45.60 |
| 8 | | 0.790780 (ASP) | 0.250 | | | | |
| 9 | IR-cut filter | Plano | 0.200 | Glass | 1.517 | 64.2 | — |
| 10 | | Plano | 0.251 | | | | |
| 11 | Image Plane | Plano | — | | | | |

Note:
Reference wavelength is d-line 587.6 nm, the effective radius of Surface number 1 (the stop) is 0.470 mm and ASP represents aspheric.

In Table 1-1, from the object-side surface 111 to the image-side surface 132, all the surfaces can be aspheric, and the aspheric surfaces can satisfy Formula ASP, but are not limited thereto. As for the parameters of the aspheric surfaces, reference is made to Table 1-2 below:

TABLE 1-2

Aspheric Coefficients

| Surface# | | | |
|---|---|---|---|
| | 2 | 3 | 5 |
| k = | 1.08225E+00 | 1.09093E+00 | −1.08538E+00 |
| $A_4$ = | −9.16925E−01 | −7.36774E−01 | 2.34191E+00 |
| $A_6$ = | 2.08603E+00 | −5.47438E+00 | −4.46181E+01 |
| $A_8$ = | −2.95700E+01 | 3.20240E+01 | 8.23854E+02 |
| $A_{10}$ = | — | — | −6.13742E+03 |
| $A_{12}$ = | — | — | 1.71634E+04 |

| Surface# | | | |
|---|---|---|---|
| | 6 | 7 | 8 |
| k = | −6.25716E+00 | −5.47678E+00 | −7.38524E+00 |
| $A_4$ = | −2.86297E+00 | −1.59702E+00 | −1.04706E+00 |
| $A_6$ = | 1.57636E+01 | 3.53632E+00 | 1.37381E+00 |
| $A_8$ = | −4.98441E+00 | −5.01051E+00 | −1.98783E+00 |
| $A_{10}$ = | −3.16007E+01 | −1.10038E+00 | 5.39347E−01 |
| $A_{12}$ = | — | 9.36382E+00 | 1.12068E+00 |
| $A_{14}$ = | — | — | −3.42822E−01 |

In Table 1-1, the curvature radius, the thickness and the focal length are shown in millimeters (mm). Surface numbers 0-11 represent the surfaces sequentially arranged from the object-side to the image-side along the optical axis. "f" stands for the focal length, "Fno" is the f-number, and "HFOV" is a half of maximal field of view of this embodiment. In Table 1-2, k represents the conic coefficient of the equation of the aspheric surface profiles. A1-A14 represent the aspheric coefficients ranging from the $1^{st}$ order to the $14^{th}$ order. All labels for Tables of the remaining embodiments share the same definitions as those in Table 1-1 and Table 1-2 of the first embodiment, and their definitions will not be stated again.

The content of Table 1-3 may be deduced from Table 1-1:

TABLE 1-3

Embodiment 1

| | | | |
|---|---|---|---|
| f (mm) | 1.38 | $(R_3 + R_4)/(R_3 − R_4)$ | −6.11 |
| Fno | 2.02 | $R_6/f$ | 0.57 |
| HFOV (deg.) | 32.1 | TD (mm) | 1.35 |
| $V_2$ | 23.4 | $f_1/f_3$ | −0.02 |
| $CT_{max}$ (mm) | 0.43 | ΣCT (mm) | 1.08 |
| $CT_{min}$ (mm) | 0.32 | SL/TTL | 0.80 |
| $(R_1 + R_2)/(R_1 − R_2)$ | −0.05 | — | — |

It can be observed from Table 1-3 that $(R_1+R_2)/(R_1−R_2)$ equals −0.05 which satisfies Condition 1; ΣCT equals 1.08 mm which satisfies Condition 2; $(R_3+R_4)/(R_3−R_4)$ equals −6.11 which satisfies Condition 3; $f_1/f_3$ equals −0.02 which satisfies Condition 4; TD equals 1.35 mm which satisfies Condition 5.

$CT_{max}$ equals 0.43 mm which satisfies Condition 6; $CT_{min}$ equals 0.32 which satisfies Condition 7; $V_2$ equals 23.4 which satisfies Condition 8; SL/TTL equals 0.80 which satisfies Condition 9; $R_6/f$ equals 0.57 which satisfies Condition 10.

The Second Embodiment (Embodiment 2)

Referring to FIGS. 2A to 2D, the second embodiment is substantially the same as the first embodiment. A first lens element 210, an aperture stop 200, a second lens element 220, a third lens element 230, an IR-cut filter (infrared) 240, an image plane 260 and an image sensor 270 correspond to those in the first embodiment with the same function or structure. Therefore, the similarities will not be repeated herein.

In the second embodiment, a piece of cover glass 250 without affecting the focal length of the photographing lens system 2 is disposed between the IR-cut filter (infrared) 240 and the image plane 260. Compared to the second embodiment, the stop is further disposed in the first embodiment.

The first lens element 210 with positive refractive power has a convex object-side surface 211 and a convex image-side surface 212. The second lens element 220 with negative refractive power has a concave object-side surface 221 and a convex image-side surface 222. The third lens element 230 with negative refractive power has a convex object-side surface 231 and a concave image-side surface 232.

The detailed data of the photographing lens system 2 is as shown in Table 2-1 below:

TABLE 2-1

Embodiment 2
f = 1.69 mm, Fno = 2.45, HFOV = 37.4 deg.

| Surface # | | Curvature radius (mm) | Thickness (mm) | Material | Index | Abbe # | Focal length (mm) |
|---|---|---|---|---|---|---|---|
| 0 | Object | Plano | Infinity | | | | |
| 1 | Lens 1 | 1.698890 (ASP) | 0.436 | Plastic | 1.544 | 55.9 | 1.38 |
| 2 | | −1.220410 (ASP) | −0.048 | | | | |
| 3 | Ape. Stop | Plano | 0.360 | | | | |
| 4 | Lens 2 | −0.344730 (ASP) | 0.287 | Plastic | 1.632 | 23.4 | −121.94 |
| 5 | | −0.457920 (ASP) | 0.035 | | | | |
| 6 | Lens 3 | 1.596760 (ASP) | 0.440 | Plastic | 1.544 | 55.9 | −48.06 |
| 7 | | 1.358750 (ASP) | 0.250 | | | | |
| 8 | IR-cut filter | Plano | 0.200 | Glass | 1.517 | 64.2 | — |
| 9 | | Plano | 0.100 | | | | |
| 10 | Cover glass | Plano | 0.400 | Glass | 1.517 | 64.2 | — |
| 11 | | Plano | 0.160 | | | | |
| 12 | Image Plane | Plano | — | | | | |

Note:
Reference wavelength is d-line 587.6 nm, and ASP represents aspheric.

As for the parameters of the aspheric surfaces, reference is made to Table 2-2 below.

TABLE 2-2

Aspheric Coefficients

| Surface# | 1 | 2 | 4 |
|---|---|---|---|
| k = | −2.28108E+01 | 0.00000E+00 | −2.19809E+00 |
| $A_4$ = | 1.81729E−01 | −9.06000E−01 | −2.92888E+00 |
| $A_6$ = | −5.75066E+00 | 2.38381E+00 | 3.20397E+01 |
| $A_8$ = | 2.27095E+01 | −2.78202E+01 | −1.01400E+02 |
| $A_{10}$ = | −7.76092E+01 | 1.03098E+02 | 1.17552E+02 |

| Surface# | 5 | 6 | 7 |
|---|---|---|---|
| k = | −1.82183E+00 | −9.92196E−01 | −2.94521E+01 |
| $A_4$ = | −1.63112E−02 | 2.37878E−02 | −3.16388E−01 |
| $A_6$ = | 5.22040E+00 | −2.43510E−02 | 6.58530E−01 |
| $A_8$ = | −3.38412E−01 | −1.51644E−02 | −8.15018E−01 |
| $A_{10}$ = | −1.29550E+01 | — | 4.73235E−01 |
| $A_{12}$ = | — | — | −1.18004E−01 |

The content of Table 2-3 may be deduced from Table 2-1.

TABLE 2-3

Embodiment 2

| f (mm) | 1.69 | $(R_3 + R_4)/(R_3 - R_4)$ | −7.09 |
|---|---|---|---|
| Fno | 2.45 | $R_6/f$ | 0.80 |

TABLE 2-3-continued

Embodiment 2

| HFOV (deg.) | 37.5 | TD (mm) | 1.51 |
|---|---|---|---|
| $V_2$ | 23.4 | $f_1/f_3$ | −0.03 |
| $CT_{max}$ (mm) | 0.44 | $\Sigma CT$ (mm) | 1.16 |
| $CT_{min}$ (mm) | 0.29 | SL/TTL | 0.84 |
| $(R_1 + R_2)/(R_1 - R_2)$ | 0.16 | — | — |

The Third Embodiment (Embodiment 3)

Referring to FIGS. 3A to 3D, the third embodiment is substantially the same as the first embodiment. A first lens element 310, an aperture stop 300, a second lens element 320, a third lens element 330, an IR-cut filter (infrared) 340, an image plane 360 and an image sensor 370 correspond to those in the first embodiment with the same function or structure. Therefore, the similarities will not be repeated herein. The stop is further disposed in the first embodiment compared to the third embodiment.

In this embodiment, the first lens element 310 with positive refractive power has a convex object-side surface 311 and a convex image-side surface 312. The second lens element 320 with negative refractive power has a concave object-side surface 321 and a convex image-side surface 322. The third lens element 330 with negative refractive power has a convex object-side surface 331 and a concave image-side surface 332.

The detailed data of the photographing lens system 3 is as shown in Table 3-1 below.

TABLE 3-1

Embodiment 3
f = 1.70 mm, Fno = 2.45, HFOV = 37.4 deg.

| Surface # | | Curvature radius (mm) | Thickness (mm) | Material | Index | Abbe # | Focal length (mm) |
|---|---|---|---|---|---|---|---|
| 0 | Object | Plano | Infinity | | | | |
| 1 | Lens 1 | 1.455590 (ASP) | 0.414 | Plastic | 1.544 | 55.9 | 1.41 |
| 2 | | −1.466720 (ASP) | −0.038 | | | | |
| 3 | Ape. Stop | Plano | 0.352 | | | | |
| 4 | Lens 2 | −0.365490 (ASP) | 0.250 | Plastic | 1.634 | 23.8 | −124.08 |
| 5 | | −0.464650 (ASP) | 0.058 | | | | |
| 6 | Lens 3 | 1.688320 (ASP) | 0.519 | Plastic | 1.544 | 55.9 | −14.47 |
| 7 | | 1.239560 (ASP) | 0.300 | | | | |
| 8 | IR-cut filter | Plano | 0.300 | Glass | 1.517 | 64.2 | — |
| 9 | | Plano | 0.271 | | | | |
| 10 | Image Plane | Plano | — | | | | |

Note:
Reference wavelength is d-line 587.6 nm, and ASP represents aspheric.

As for the parameters of the aspheric surfaces, reference is made to Table 3-2 below.

TABLE 3-2

Aspheric Coefficients

| | Surface# | | |
|---|---|---|---|
| | 1 | 2 | 4 |
| k = | −4.18865E+01 | 0.00000E+00 | −2.00315E+00 |
| $A_4$ = | 9.43122E−01 | −9.48167E−01 | −1.39775E+00 |
| $A_6$ = | −9.65010E+00 | 1.13202E+00 | 1.39985E+01 |
| $A_8$ = | 3.14117E+01 | −1.13477E+01 | 1.50480E+01 |
| $A_{10}$ = | −7.45039E+01 | 4.20205E+01 | −1.57359E+02 |

| | Surface# | | |
|---|---|---|---|
| | 5 | 6 | 7 |
| k = | −2.13661E+00 | −2.57014E+01 | −2.02952E+01 |
| $A_4$ = | −6.05446E−01 | −4.38448E−03 | −3.25462E−01 |
| $A_6$ = | 6.49971E+00 | −7.67919E−02 | 5.37882E−01 |
| $A_8$ = | 9.11346E+00 | 4.78071E−03 | −6.92228E−01 |
| $A_{10}$ = | −3.77079E+01 | — | 4.27423E−01 |
| $A_{12}$ = | — | — | −1.19507E−01 |

The content of Table 3-3 may be deduced from Table 3-1.

TABLE 3-3

| Embodiment 3 | | | |
|---|---|---|---|
| f (mm) | 1.70 | $(R_3 + R_4)/(R_3 − R_4)$ | −8.37 |
| Fno | 2.45 | $R_6/f$ | 0.73 |
| HFOV (deg.) | 37.4 | TD (mm) | 1.56 |
| $V_2$ | 23.8 | $f_1/f_3$ | −0.10 |
| $CT_{max}$ (mm) | 0.52 | $\Sigma CT$ (mm) | 1.18 |
| $CT_{min}$ (mm) | 0.25 | SL/TTL | 0.84 |
| $(R_1 + R_2)/(R_1 − R_2)$ | 0.00 | — | — |

The Fourth Embodiment (Embodiment 4)

Referring to FIGS. 4A to 4D, the fourth embodiment is substantially the same as the second embodiment. A first lens element 410, an aperture stop 400, a second lens element 420, a third lens element 430, an IR-cut filter (infrared) 440, a piece of cover glass 450, an image plane 460 and an image sensor 470 correspond to those in the second embodiment with the same function or structure. Therefore, the similarities will not be repeated herein.

The first lens element 410 with positive refractive power has a convex object-side surface 411 and a convex image-side surface 412. The second lens element 420 with negative refractive power has a concave object-side surface 421 and a convex image-side surface 422. The third lens element 430 with negative refractive power has a convex object-side surface 431 and a concave image-side surface 432.

The detailed data of the photographing lens system 4 is as shown in Table 4-1 below.

TABLE 4-1

Embodiment 4
f = 1.83 mm, Fno = 2.46, HFOV = 37.4 deg.

| Surface# | | Curvature radius (mm) | Thickness (mm) | Material | Index | Abbe # | Focal length (mm) |
|---|---|---|---|---|---|---|---|
| 0 | Object | Plano | Infinity | | | | |
| 1 | Lens 1 | 1.289820 (ASP) | 0.421 | Plastic | 1.544 | 55.9 | 1.41 |
| 2 | | −1.671970 (ASP) | −0.049 | | | | |
| 3 | Ape. Stop | Plano | 0.367 | | | | |
| 4 | Lens 2 | −0.396800 (ASP) | 0.259 | Plastic | 1.640 | 23.3 | −6.89 |
| 5 | | −0.547100 (ASP) | 0.108 | | | | |
| 6 | Lens 3 | 1.412720 (ASP) | 0.504 | Plastic | 1.544 | 55.9 | −72.81 |
| 7 | | 1.192590 (ASP) | 0.200 | | | | |
| 8 | IR-cut filter | Plano | 0.200 | Glass | 1.517 | 64.2 | — |
| 9 | | Plano | 0.100 | | | | |
| 10 | Cover glass | Plano | 0.400 | Glass | 1.517 | 64.2 | — |
| 11 | | Plano | 0.080 | | | | |
| 12 | Image Plane | Plano | — | | | | |

Note:
Reference wavelength is d-line 587.6 nm, and ASP represents aspheric.

As for the parameters of the aspheric surfaces, reference is made to Table 4-2 below.

TABLE 4-2

Aspheric Coefficients

| Surface# | 1 | 2 | 4 |
|---|---|---|---|
| k = | −1.13590E+01 | 0.00000E+00 | −2.42717E+00 |
| $A_4$ = | 1.71493E−01 | −9.43861E−01 | −2.28375E+00 |
| $A_6$ = | −2.61175E+00 | 1.74774E−01 | 9.93835E+00 |
| $A_8$ = | 1.06364E+00 | −8.86854E+00 | 7.16172E+01 |
| $A_{10}$ = | −1.47306E+01 | 4.21379E+01 | −3.61008E+02 |
| $A_{12}$ = | −3.64178E+01 | −3.67035E−03 | 2.28085E+02 |
| $A_{14}$ = | −9.78218E−01 | −1.34782E−02 | −3.37781E−03 |
| $A_{16}$ = | −2.02281E+01 | −1.09463E−02 | −7.18286E−02 |

| Surface# | 5 | 6 | 7 |
|---|---|---|---|
| k = | −1.03607E+00 | −3.18145E+01 | −1.45360E+01 |
| $A_4$ = | −4.77662E−02 | −3.34696E−01 | −3.44550E−01 |
| $A_6$ = | 3.60066E+00 | 7.65864E−01 | 3.18359E−01 |
| $A_8$ = | 1.50025E+01 | −8.25858E−01 | −2.40529E−01 |
| $A_{10}$ = | 1.06548E+01 | 3.65729E−01 | 1.10758E−01 |

TABLE 4-2-continued

Aspheric Coefficients

| $A_{12}$ = | −2.19178E+02 | 4.37134E−03 | −3.39721E−02 |
|---|---|---|---|
| $A_{14}$ = | 2.16101E+02 | −4.30298E−02 | −5.67970E−03 |
| $A_{16}$ = | 1.07613E+02 | 6.04847E−03 | 4.48138E−03 |

The content of Table 4-3 may be deduced from Table 4-1.

TABLE 4-3

Embodiment 4

| f (mm) | 1.83 | $(R_3 + R_4)/(R_3 − R_4)$ | −6.28 |
|---|---|---|---|
| Fno | 2.46 | $R_6/f$ | 0.65 |
| HFOV (deg.) | 37.4 | TD (mm) | 1.61 |
| $V_2$ | 23.3 | $f_1/f_3$ | −0.02 |

TABLE 4-3-continued

Embodiment 4

| $CT_{max}$ (mm) | 0.50 | $\Sigma CT$ (mm) | 1.18 |
|---|---|---|---|
| $CT_{min}$ (mm) | 0.26 | SL/TTL | 0.84 |
| $(R_1 + R_2)/(R_1 − R_2)$ | −0.13 | — | — |

The Fifth Embodiment (Embodiment 5)

Referring to FIGS. 5A to 5D, the fifth embodiment is substantially the same as the second embodiment. A first lens element 510, an aperture stop 500, a second lens element 520, a third lens element 530, an IR-cut filter (infrared) 540, a piece of cover glass 550, an image plane 560 and an image sensor 570 correspond to those in the second embodiment with the same function or structure. Therefore, the similarities will not be repeated herein.

In this embodiment, the first lens element 510 with positive refractive power has a convex object-side surface 511 and a convex image-side surface 512. The second lens element 520 with negative refractive power has a concave object-side surface 521 and a convex image-side surface 522. The third lens element 530 with negative refractive power has a convex object-side surface 531 and a concave image-side surface 532.

The detailed data of the photographing lens system 5 is as shown in Table 5-1 below.

TABLE 5-1

Embodiment 5
f = 1.71 mm, Fno = 2.45, HFOV = 37.5 deg.

| Surface# | | Curvature Radius (mm) | Thickness (mm) | Material | Index | Abbe # | Focal length (mm) |
|---|---|---|---|---|---|---|---|
| 0 | Object | Plano | Infinity | | | | |
| 1 | Lens 1 | 1.393430 (ASP) | 0.402 | Plastic | 1.544 | 55.9 | 1.44 |
| 2 | | −1.600690 (ASP) | −0.048 | | | | |
| 3 | Ape. Stop | Plano | 0.374 | | | | |
| 4 | Lens 2 | −0.327760 (ASP) | 0.233 | Plastic | 1.640 | 23.3 | −112.16 |
| 5 | | −0.420590 (ASP) | 0.040 | | | | |
| 6 | Lens 3 | 1.724820 (ASP) | 0.480 | Plastic | 1.544 | 55.9 | −43.20 |
| 7 | | 1.449330 (ASP) | 0.200 | | | | |
| 8 | IR-cut filter | Plano | 0.200 | Glass | 1.517 | 64.2 | — |
| 9 | | Plano | 0.100 | | | | |
| 10 | Cover glass | Plano | 0.400 | Glass | 1.517 | 64.2 | — |
| 11 | | Plano | 0.147 | | | | |
| 12 | Image Plane | Plano | — | | | | |

Note:
Reference wavelength is d-line 587.6 nm, ASP represents aspheric.

As for the parameters of the aspheric surfaces, reference is made to Table 5-2 below.

TABLE 5-2

Aspheric Coefficients

| Surface# | 1 | 2 | 4 |
|---|---|---|---|
| k = | −3.06219E+01 | 0.00000E+00 | −1.56705E+00 |
| $A_4$ = | 8.68037E−01 | −1.08757E+00 | −1.19908E+00 |
| $A_6$ = | −9.26242E+00 | 1.60450E+00 | 1.44074E+01 |
| $A_8$ = | 3.15216E+01 | −1.75517E+01 | 4.23773E+01 |

TABLE 5-2-continued

Aspheric Coefficients

| | | | |
|---|---|---|---|
| $A_{10} =$ | −8.34567E+01 | 6.85792E+01 | −2.74531E+02 |
| $A_{12} =$ | — | — | −3.92894E+01 |

TABLE 5-2-continued

Aspheric Coefficients

| | Surface# | | |
|---|---|---|---|
| | 5 | 6 | 7 |
| $k =$ | −2.14534E+00 | −2.63880E+01 | −3.45754E+01 |
| $A_4 =$ | −1.07927E+00 | 4.28386E-02 | −3.77127E-01 |
| $A_6 =$ | 8.62823E+00 | −1.39005E-01 | 6.67000E-01 |
| $A_8 =$ | 1.35041E+01 | 7.96876E-02 | −9.33889E-01 |
| $A_{10} =$ | −5.65339E+01 | 4.82155E-02 | 7.30652E-01 |
| $A_{12} =$ | −2.02685E+00 | −3.23290E-02 | −3.48590E-01 |
| $A_{14} =$ | — | — | 8.67165E-02 |

The content of Table 5-3 may be deduced from Table 5-1.

TABLE 5-3

Embodiment 5

| | | | |
|---|---|---|---|
| f (mm) | 1.71 | $(R_3 + R_4)/(R_3 - R_4)$ | −8.06 |
| Fno | 2.45 | $R_6/f$ | 0.85 |
| HFOV (deg.) | 37.5 | TD (mm) | 1.48 |
| $V_2$ | 23.3 | $f_1/f_3$ | −0.03 |
| $CT_{max}$ (mm) | 0.48 | $\Sigma CT$ (mm) | 1.12 |
| $CT_{min}$ (mm) | 0.23 | SL/TTL | 0.85 |
| $(R_1 + R_2)/(R_1 - R_2)$ | −0.07 | — | — |

The Sixth Embodiment (Embodiment 6)

Referring to FIGS. 6A to 6D, the sixth embodiment is substantially the same as the third embodiment. A first lens element 610, an aperture stop 600, a second lens element 620, a third lens element 630, an IR-cut filter (infrared) 640, an image plane 660 and an image sensor 670 correspond to those in the third embodiment with the same function or structure. Therefore, the similarities will not be repeated herein.

In this embodiment, the first lens element 610 with positive refractive power has a convex object-side surface 611 and a convex image-side surface 612. The second lens element 620 with negative refractive power has a concave object-side surface 621 and a convex image-side surface 622. The third lens element 630 with negative refractive power has a convex object-side surface 631 and a concave image-side surface 632.

The detailed data of the photographing lens system 6 is as shown in Table 6-1 below.

TABLE 6-1

Embodiment 6
f = 2.04 mm, Fno = 2.60, HFOV = 34.1 deg.

| Surface# | | Curvature Radius (mm) | Thickness (mm) | Material | Index | Abbe # | Focal length (mm) |
|---|---|---|---|---|---|---|---|
| 0 | Object | Plano | Infinity | | | | |
| 1 | Lens 1 | 1.819410 (ASP) | 0.455 | Plastic | 1.544 | 55.9 | 1.61 |
| 2 | | −1.533760 (ASP) | −0.039 | | | | |
| 3 | Ape. Stop | Plano | 0.465 | | | | |
| 4 | Lens 2 | −0.508150 (ASP) | 0.241 | Plastic | 1.640 | 23.3 | −12.69 |
| 5 | | −0.642380 (ASP) | 0.122 | | | | |
| 6 | Lens 3 | 2.108410 (ASP) | 0.606 | Plastic | 1.535 | 56.3 | −9.15 |
| 7 | | 1.325820 (ASP) | 0.300 | | | | |
| 8 | IR-cut filter | Plano | 0.200 | Glass | 1.517 | 64.2 | — |
| 9 | | Plano | 0.304 | | | | |
| 10 | Image Plane | Plano | — | | | | |

Note:
Reference wavelength is d-line 587.6 nm, and ASP represents aspheric.

As for the parameters of the aspheric surfaces, reference is made to Table 6-2 below.

TABLE 6-2

Aspheric Coefficients

| | Surface# | | |
|---|---|---|---|
| | 1 | 2 | 4 |
| $k =$ | −3.08097E+01 | −4.98671E+00 | −3.83132E+00 |
| $A_4 =$ | 1.69734E-01 | −7.40562E-01 | −1.51363E+00 |
| $A_6 =$ | −2.56392E+00 | 4.29937E-01 | 6.73914E+00 |
| $A_8 =$ | 2.54285E+00 | −2.74306E+00 | 3.32041E+00 |
| $A_{10} =$ | −4.56298E+00 | 6.58429E+00 | −1.84960E+02 |
| $A_{12} =$ | 5.85569E+00 | −4.32259E-03 | 2.33924E+02 |
| $A_{14} =$ | −3.67347E+01 | −1.46288E-02 | −4.52759E-03 |
| $A_{16} =$ | −2.02295E+01 | −1.29761E-02 | −7.38576E-02 |

| | Surface# | | |
|---|---|---|---|
| | 5 | 6 | 7 |
| $k =$ | −1.85069E+00 | −2.00000E+01 | −7.45959E+00 |
| $A_4 =$ | −3.39189E-02 | −8.19814E-01 | −4.35028E-01 |
| $A_6 =$ | 4.69625E-01 | 1.15616E+00 | 4.15074E-01 |
| $A_8 =$ | 1.20239E+01 | −1.01751E+00 | −3.24821E-01 |
| $A_{10} =$ | 2.12351E+01 | 3.18107E-01 | 7.16390E-02 |
| $A_{12} =$ | −1.74930E+02 | −5.74732E-02 | 2.57011E-02 |
| $A_{14} =$ | 2.30016E+02 | −2.21336E-01 | 3.01274E-03 |
| $A_{16} =$ | −6.16864E+01 | 5.41266E-01 | −1.47290E-02 |

The content of Table 6-3 may be deduced from Table 6-1.

TABLE 6-3

Embodiment 6

| | | | |
|---|---|---|---|
| f (mm) | 2.04 | $(R_3 + R_4)/(R_3 - R_4)$ | −8.57 |
| Fno | 2.60 | $R_6/f$ | 0.65 |
| HFOV (deg.) | 34.1 | TD (mm) | 1.85 |

TABLE 6-3-continued

Embodiment 6

| | | | |
|---|---|---|---|
| $V_2$ | 23.3 | $f_1/f_3$ | −0.18 |
| $CT_{max}$ (mm) | 0.61 | $\Sigma CT$ (mm) | 1.30 |
| $CT_{min}$ (mm) | 0.24 | SL/TTL | 0.84 |
| $(R_1 + R_2)/(R_1 - R_2)$ | 0.09 | — | — |

The Seventh Embodiment (Embodiment 7)

Referring to FIGS. 7A to 7D, the seventh embodiment is substantially the same as the third embodiment. A first lens element 710, an aperture stop 700, a second lens element 720, a third lens element 730, an IR-cut filter (infrared) 740, an image plane 760 and an image sensor 770 correspond to those in the third embodiment with the same function or structure. Therefore, the similarities will not be repeated herein.

In this embodiment, the first lens element 710 with positive refractive power has a convex object-side surface 711 and a convex image-side surface 712. The second lens element 720 with negative refractive power has a concave object-side surface 721 and a convex image-side surface 722. The third lens element 730 with negative refractive power has a convex object-side surface 731 and a concave image-side surface 732.

The detailed data of the photographing lens system 7 is as shown in Table 7-1 below.

TABLE 7-1

Embodiment 7
f = 1.99 mm, Fno = 2.60, HFOV = 34.9 deg.

| Surface# | | Curvature Radius (mm) | Thickness (mm) | Material | Index | Abbe # | Focal length (mm) |
|---|---|---|---|---|---|---|---|
| 0 | Object | Plano | Infinity | | | | |
| 1 | Lens 1 | 4.417000 (ASP) | 0.482 | Plastic | 1.544 | 55.9 | 1.47 |
| 2 | | −0.936940 (ASP) | −0.087 | | | | |
| 3 | Ape. Stop | Plano | 0.507 | | | | |
| 4 | Lens 2 | −0.509680 (ASP) | 0.266 | Plastic | 1.650 | 21.4 | −4.75 |
| 5 | | −0.735900 (ASP) | 0.198 | | | | |
| 6 | Lens 3 | 1.399320 (ASP) | 0.554 | Plastic | 1.535 | 56.3 | −39.45 |
| 7 | | 1.131430 (ASP) | 0.300 | | | | |
| 8 | IR-cut filter | Plano | 0.200 | Glass | 1.517 | 64.2 | — |
| 9 | | Plano | 0.305 | | | | |
| 10 | Image Plane | Plano | — | | | | |

Note:
Reference wavelength is d-line 587.6 nm, and ASP represents aspheric.

As for the parameters of the aspheric surfaces, reference is made to Table 7-2 below.

TABLE 7-3

Aspheric Coefficients

| | Surface# | | |
|---|---|---|---|
| | 1 | 2 | 4 |
| k = | −5.00000E+01 | −1.96881E+00 | −3.84047E+00 |
| $A_4 =$ | −5.56938E−01 | −7.15717E−01 | −1.30584E+00 |
| $A_6 =$ | −1.79405E+00 | 5.05666E−01 | 6.71079E+00 |
| $A_8 =$ | 4.28188E+00 | −3.40098E+00 | 2.67933E+01 |
| $A_{10} =$ | −2.09655E+01 | 6.67002E+00 | −1.70201E+02 |
| $A_{12} =$ | 2.02833E+01 | −4.31657E−03 | 2.33924E+02 |

TABLE 7-3-continued

Aspheric Coefficients

| $A_{14} =$ | −1.33190E+02 | −1.46201E−02 | −4.51868E−03 |
| $A_{16} =$ | 3.62824E+01 | −1.29630E−02 | −7.38444E−02 |

| | Surface# | | |
|---|---|---|---|
| | 5 | 6 | 7 |
| k = | −2.21835E+00 | −3.72410E+00 | −3.03751E+00 |
| $A_4 =$ | −3.53436E−02 | −9.51276E−01 | −5.29213E−01 |
| $A_6 =$ | −3.57928E−02 | 1.06039E+00 | 4.86785E−01 |
| $A_8 =$ | 9.32129E+00 | −7.55228E−01 | −2.74492E−01 |
| $A_{10} =$ | 2.50918E+01 | 5.54147E−01 | 2.18230E−02 |
| $A_{12} =$ | −1.74577E+02 | −7.41607E−02 | 3.34304E−02 |
| $A_{14} =$ | 2.42340E+02 | −3.09409E−01 | 7.54967E−03 |
| $A_{16} =$ | −7.57803E+01 | −6.56022E−01 | −1.55608E−02 |

The content of Table 7-3 may be deduced from Table 7-1.

TABLE 7-3

Embodiment 7

| | | | |
|---|---|---|---|
| f (mm) | 1.99 | $(R_3 + R_4)/(R_3 - R_4)$ | −5.51 |
| Fno | 2.60 | $R_6/f$ | 0.57 |
| HFOV (deg.) | 34.9 | TD (mm) | 1.92 |

TABLE 7-3-continued

Embodiment 7

| | | | |
|---|---|---|---|
| $V_2$ | 21.4 | $f_1/f_3$ | −0.04 |
| $CT_{max}$ (mm) | 0.55 | $\Sigma CT$ (mm) | 1.30 |
| $CT_{min}$ (mm) | 0.27 | SL/TTL | 1.00 |
| $(R_1 + R_2)/(R_1 - R_2)$ | 0.65 | — | — |

The Eighth Embodiment (Embodiment 8)

Referring to FIGS. 8A to 8D, the eighth embodiment is substantially the same as the third embodiment. A first lens element 810, an aperture stop 800, a second lens element 820, a third lens element 830, an IR-cut filter (infrared) 840, an image plane 860 and an image sensor 870 correspond to those in the third embodiment with the same function or structure. Therefore, the similarities will not be repeated herein.

In this embodiment, the first lens element 810 with positive refractive power has a convex object-side surface 811 and a convex image-side surface 812. The second lens element 820 with negative refractive power has a concave object-side surface 821 and a convex image-side surface 822. The third lens element 830 with negative refractive power has a convex object-side surface 831 and a concave image-side surface 832.

The detailed data of the photographing lens system 8 is as shown in Table 8-1 below.

TABLE 8-1

Embodiment 8
f = 1.97 mm, Fno = 2.60, HFOV = 35.0 deg.

| Surface# | | Curvature Radius (mm) | Thickness (mm) | Material | Index | Abbe # | Focal length (mm) |
|---|---|---|---|---|---|---|---|
| 0 | Object | Plano | Infinity | | | | |
| 1 | Lens 1 | 9.076500 (ASP) | 0.483 | Plastic | 1.592 | 68.4 | 1.46 |
| 2 | | −0.936190 (ASP) | −0.088 | | | | |
| 3 | Ape. Stop | Plano | 0.535 | | | | |
| 4 | Lens 2 | −0.512150 (ASP) | 0.266 | Plastic | 1.650 | 21.4 | −4.88 |
| 5 | | −0.735770 (ASP) | 0.204 | | | | |
| 6 | Lens 3 | 1.379240 (ASP) | 0.522 | Plastic | 1.535 | 56.3 | −39.32 |
| 7 | | 1.123670 (ASP) | 0.300 | | | | |
| 8 | IR-cut filter | Plano | 0.200 | Glass | 1.517 | 64.2 | — |
| 9 | | Plano | 0.304 | | | | |
| 10 | Image Plane | Plano | — | | | | |

Note:
Reference wavelength is d-line 587.6 nm; ASP represents aspheric.

As for the parameters of the aspheric surfaces, reference is made to Table 8-2 below.

TABLE 8-2

Aspheric Coefficients

| | Surface# | | |
|---|---|---|---|
| | 1 | 2 | 4 |
| $k =$ | −5.00000E+01 | −2.26489E+00 | −3.93487E+00 |
| $A_4 =$ | −6.29338E−01 | −7.33187E−01 | −1.31302E+00 |
| $A_6 =$ | −1.74102E+00 | 5.13049E−01 | 6.73662E+00 |
| $A_8 =$ | 4.47625E+00 | −3.06455E+00 | 2.65290E+01 |
| $A_{10} =$ | −2.15851E+01 | 5.77398E+00 | −1.69257E+02 |
| $A_{12} =$ | 2.02833E+01 | −4.31752E−03 | 2.33924E+02 |

TABLE 8-2-continued

Aspheric Coefficients

| $A_{14} =$ | −1.33190E+02 | −1.46215E−02 | −4.51995E−03 |
|---|---|---|---|
| $A_{16} =$ | 3.62824E+01 | −1.29645E−02 | −7.38459E−02 |

| | Surface# | | |
|---|---|---|---|
| | 5 | 6 | 7 |
| $k =$ | −2.21794E+00 | −4.08124E+00 | −3.78484E+00 |
| $A_4 =$ | −3.73824E−02 | −9.73808E−01 | −5.20099E−01 |
| $A_6 =$ | −3.44497E−02 | 1.07319E+00 | 4.87534E−01 |

TABLE 8-2-continued

Aspheric Coefficients

| $A_8 =$ | 9.25542E+00 | −6.84187E−01 | −2.76689E−01 |
|---|---|---|---|
| $A_{10} =$ | 2.53323E+01 | 4.72371E−01 | 2.15738E−02 |
| $A_{12} =$ | −1.74577E+02 | −8.99275E−02 | 3.95629E−02 |
| $A_{14} =$ | 2.42340E+02 | −2.82926E−01 | 2.64706E−03 |
| $A_{16} =$ | −7.57803E+01 | −5.70980E−01 | −1.57071E−02 |

The content of Table 8-3 may be deduced from Table 8-1.

TABLE 8-3

Embodiment 8

| f (mm) | 1.97 | $(R_3 + R_4)/(R_3 − R_4)$ | −5.58 |
|---|---|---|---|
| Fno | 2.60 | $R_6/f$ | 0.57 |
| HFOV (deg.) | 35.0 | TD (mm) | 1.92 |
| $V_2$ | 21.4 | $f_1/f_3$ | −0.04 |
| $CT_{max}$ (mm) | 0.52 | $\Sigma CT$ (mm) | 1.27 |
| $CT_{min}$ (mm) | 0.27 | SL/TTL | 1.00 |
| $(R_1 + R_2)/(R_1 − R_2)$ | 0.81 | — | — |

The Ninth Embodiment (Embodiment 9)

Referring to FIGS. 9A to 9D, the ninth embodiment is substantially the same as the third embodiment. A first lens element 910, an aperture stop 900, a second lens element 920, a third lens element 930, an IR-cut filter (infrared) 940, an image plane 960 and an image sensor 970 correspond to those in the third embodiment with the same function or structure. Therefore, the similarities will not be repeated herein.

In this embodiment, the first lens element 910 with positive refractive power has a convex object-side surface 911 and a convex image-side surface 912. The second lens element 920 with negative refractive power has a concave object-side surface 921 and a convex image-side surface 922. The third lens element 930 with negative refractive power has a convex object-side surface 931 and a concave image-side surface 932.

The detailed data of the photographing lens system 9 is as shown in Table 9-1 below.

TABLE 9-1

Embodiment 9
f = 2.03 mm, Fno = 2.60, HFOV = 34.2 deg.

| Surface# | | Curvature Radius (mm) | Thickness (mm) | Material | Index | Abbe # | Focal length (mm) |
|---|---|---|---|---|---|---|---|
| 0 | Object | Plano | Infinity | | | | |
| 1 | Lens 1 | 2.096710 (ASP) | 0.519 | Glass | 1.592 | 68.4 | 1.38 |
| 2 | | −1.220280 (ASP) | −0.061 | | | | |
| 3 | Ape. Stop | Plano | 0.392 | | | | |
| 4 | Lens 2 | −0.538710 (ASP) | 0.312 | Plastic | 1.650 | 21.4 | −4.32 |
| 5 | | −0.818880 (ASP) | 0.177 | | | | |
| 6 | Lens 3 | 1.669440 (ASP) | 0.554 | Plastic | 1.535 | 56.3 | −15.60 |
| 7 | | 1.230150 (ASP) | 0.300 | | | | |
| 8 | IR-cut filter | Plano | 0.200 | Glass | 1.517 | 64.2 | — |
| 9 | | Plano | 0.303 | | | | |
| 10 | Image Plane | Plano | — | | | | |

Note:
Reference wavelength is d-line 587.6 nm; ASP represents aspheric.

As for the parameters of the aspheric surfaces, reference is made to Table 9-2 below.

TABLE 9-2

Aspheric Coefficients

| | Surface# | | |
|---|---|---|---|
| | 1 | 2 | 4 |
| k = | −2.00000E+01 | −3.42622E+00 | −3.73846E+00 |
| $A_4$ = | −8.39365E−02 | −7.99623E−01 | −1.48121E+00 |
| $A_6$ = | −2.53474E+00 | 4.04376E+00 | 6.74584E+00 |
| $A_8$ = | 5.38057E+00 | −4.62683E−01 | 3.17132E+01 |
| $A_{10}$ = | −1.45440E+01 | −7.22216E−01 | −1.94391E+02 |
| $A_{12}$ = | 2.02833E+01 | −4.31792E−03 | 2.33924E+02 |
| $A_{14}$ = | −1.33190E+02 | −1.46219E−02 | −4.52054E−03 |
| $A_{16}$ = | 3.62824E+01 | −1.29655E−02 | −7.38469E−02 |

| | Surface# | | |
|---|---|---|---|
| | 5 | 6 | 7 |
| k = | −1.93657E+00 | −1.12363E+01 | −5.45217E+00 |
| $A_4$ = | −4.27612E−02 | −9.12753E−01 | −4.68042E−01 |

TABLE 9-2-continued

Aspheric Coefficients

| $A_6$ = | 2.51028E−01 | 1.17067E+00 | 4.24230E−01 |
|---|---|---|---|
| $A_8$ = | 1.07546E+01 | −7.68269E−01 | −2.87332E−01 |
| $A_{10}$ = | 2.03525E+01 | 4.86232E−01 | 6.03333E−02 |
| $A_{12}$ = | −1.74577E+02 | −1.25649E−01 | 2.40498E−02 |

TABLE 9-2-continued

Aspheric Coefficients

| $A_{14}$ = | 2.42340E+02 | −3.94104E−01 | 6.30954E−03 |
|---|---|---|---|
| $A_{16}$ = | −7.57803E+01 | −5.23459E−01 | −1.79405E−02 |

The content of Table 9-3 may be deduced from Table 9-1.

TABLE 9-3

Embodiment 9

| f (mm) | 2.03 | $(R_3 + R_4)/(R_3 − R_4)$ | −4.85 |
|---|---|---|---|
| Fno | 2.60 | $R_6/f$ | 0.61 |
| HFOV (deg.) | 34.2 | TD (mm) | 1.89 |
| $V_2$ | 21.4 | $f_1/f_3$ | −0.09 |
| $CT_{max}$ (mm) | 0.55 | $\Sigma CT$ (mm) | 1.39 |
| $CT_{min}$ (mm) | 0.31 | SL/TTL | 0.83 |
| $(R_1 + R_2)/(R_1 − R_2)$ | 0.26 | — | — |

The Tenth Embodiment (Embodiment 10)

Referring to FIGS. 10A to 10D, the tenth embodiment is substantially the same as the third embodiment. A first lens element 1010, an aperture stop 1000, a second lens element 1020, a third lens element 1030, an IR-cut filter (infrared) 1040, an image plane 1060 and an image sensor 1070 correspond to those in the third embodiment with the same function or structure. Therefore, the similarities will not be repeated herein. In this embodiment, the aperture stop 1000 is disposed in front of the first lens element 1010.

In this embodiment, the first lens element 1010 with positive refractive power has a convex object-side surface 1011 and a convex image-side surface 1012. The second lens element 1020 with negative refractive power has a concave object-side surface 1021 and a convex image-side surface 1022. The third lens element 1030 with negative refractive power has a convex object-side surface 1031 and a concave image-side surface 1032.

The detailed data of the photographing lens system 10 is as shown in Table 10-1 below.

TABLE 10-1

Embodiment 10
f = 1.88 mm, Fno = 2.35, HFOV = 36.2 deg.

| Surface# | | Curvature Radius (mm) | Thickness (mm) | Material | Index | Abbe # | Focal length (mm) |
|---|---|---|---|---|---|---|---|
| 0 | Object | Plano | Infinity | | | | |
| 1 | Ape. Stop | Plano | 0.010 | | | | |
| 2 | Lens 1 | 1.643700 (ASP) | 0.451 | Glass | 1.542 | 62.9 | 1.56 |
| 3 | | −1.581010 (ASP) | 0.355 | | | | |
| 4 | Lens 2 | −0.456530 (ASP) | 0.282 | Plastic | 1.607 | 26.6 | −16.08 |
| 5 | | −0.590690 (ASP) | 0.035 | | | | |
| 6 | Lens 3 | 1.704970 (ASP) | 0.626 | Plastic | 1.535 | 56.3 | −22.32 |
| 7 | | 1.301020 (ASP) | 0.300 | | | | |
| 8 | IR-cut filter | Plano | 0.200 | Glass | 1.517 | 64.2 | — |
| 9 | | Plano | 0.357 | | | | |
| 10 | Image Plane | Plano | — | | | | |

Note:
Reference wavelength is d-line 587.6 nm; ASP represents aspheric.

As for the parameters of the aspheric surfaces, reference is made to Table 10-2 below.

TABLE 10-2

Aspheric Coefficients

| | Surface# | | |
|---|---|---|---|
| | 2 | 3 | 4 |
| k = | −1.49040E+01 | −1.61973E+00 | −2.55585E+00 |
| $A_4$ = | 2.34776E−02 | −8.21166E−01 | −1.53046E+00 |
| $A_6$ = | −3.21835E+00 | −2.23110E−01 | 6.61879E+00 |
| $A_8$ = | 1.33769E+01 | 5.36526E−02 | 3.24838E+01 |
| $A_{10}$ = | −4.94593E+01 | 8.02117E+00 | −1.84441E+02 |
| $A_{12}$ = | 5.81069E+00 | −2.35364E+01 | 2.49432E+02 |

TABLE 10-2-continued

Aspheric Coefficients

| $A_{14}$ = | −3.67585E+01 | −6.33723E+01 | 4.03618E+01 |
|---|---|---|---|
| $A_{16}$ = | −2.03845E+01 | 5.20995E+01 | −1.92913E+02 |

| | Surface# | | |
|---|---|---|---|
| | 5 | 6 | 7 |
| k = | −1.79092E+00 | −2.85882E+00 | −3.94005E+00 |
| $A_4$ = | −8.55235E−02 | −6.91849E−01 | −4.48722E−01 |
| $A_6$ = | 3.21317E−01 | 1.15966E+00 | 4.58025E−01 |
| $A_8$ = | 1.19092E+01 | −9.66582E−01 | −2.95447E−01 |
| $A_{10}$ = | 2.17110E+01 | 4.29110E−01 | 6.72158E−02 |
| $A_{12}$ = | −1.74048E+02 | −7.75311E−03 | 1.79965E−02 |
| $A_{14}$ = | 2.30777E+02 | −1.58559E−01 | −7.31724E−04 |

TABLE 10-2-continued

Aspheric Coefficients

| $A_{16}$ = | −6.56121E+01 | 6.22641E−02 | −6.03514E−03 |
|---|---|---|---|

The content of Table 10-3 may be deduced from Table 10-1.

TABLE 10-3

Embodiment 10

| f (mm) | 1.88 | $(R_3 + R_4)/(R_3 − R_4)$ | −7.81 |
|---|---|---|---|
| Fno | 2.35 | $R_6/f$ | 0.69 |
| HFOV (deg.) | 36.2 | TD (mm) | 1.75 |
| $V_2$ | 26.6 | $f_1/f_3$ | −0.07 |
| $CT_{max}$ (mm) | 0.63 | $\Sigma CT$ (mm) | 1.36 |

TABLE 10-3-continued

| Embodiment 10 | | | |
|---|---|---|---|
| $CT_{min}$ (mm) | 0.28 | SL/TTL | 1.00 |
| $(R_1 + R_2)/(R_1 - R_2)$ | 0.02 | — | — |

The Eleventh Embodiment (Embodiment 11)

Referring to FIGS. 11A to 11D, the eleventh embodiment is substantially the same as the tenth embodiment. A first lens element 1110, an aperture stop 1100, a second lens element 1120, a third lens element 1130, an IR-cut filter (infrared) 1140, an image plane 1160 and an image sensor 1170 correspond to those in the tenth embodiment with the same function or structure. Therefore, the similarities will not be repeated herein.

In this embodiment, the first lens element 1110 with positive refractive power has a convex object-side surface 1111 and a convex image-side surface 1112. The second lens element 1120 with negative refractive power has a concave object-side surface 1121 and a convex image-side surface 1122. The third lens element 1130 with negative refractive power has a convex object-side surface 1131 and a concave image-side surface 1132.

The detailed data of the photographing lens system 11 is as shown in Table 11-1 below.

TABLE 11-1

Embodiment 11
f = 2.10 mm, Fno = 2.80, HFOV = 33.4 deg.

| Surface# | | Curvature Radius (mm) | Thickness (mm) | Material | Index | Abbe # | Focal length (mm) |
|---|---|---|---|---|---|---|---|
| 0 | Object | Plano | Infinity | | | | |
| 1 | Ape. Stop | Plano | -0.016 | | | | |
| 2 | Lens 1 | 1.460060 (ASP) | 0.411 | Plastic | 1.544 | 55.9 | 1.52 |
| 3 | | -1.707100 (ASP) | 0.404 | | | | |
| 4 | Lens 2 | -0.435120 (ASP) | 0.281 | Plastic | 1.640 | 23.3 | -6.06 |
| 5 | | -0.613590 (ASP) | 0.035 | | | | |
| 6 | Lens 3 | 2.986530 (ASP) | 0.864 | Plastic | 1.535 | 56.3 | -41.86 |
| 7 | | 2.369340 (ASP) | 0.300 | | | | |
| 8 | IR-cut filter | Plano | 0.200 | Glass | 1.517 | 64.2 | — |
| 9 | | Plano | 0.302 | | | | |
| 10 | Image Plane | Plano | — | | | | |

Note:
Reference wavelength is d-line 587.6 nm; ASP represents aspheric.

As for the parameters of the aspheric surfaces, reference is made to Table 11-2 below.

TABLE 11-2

Aspheric Coefficients

| | Surface# | | |
|---|---|---|---|
| | 2 | 3 | 4 |
| k = | -1.31201E+01 | -1.65112E+00 | -2.51750E+00 |
| $A_4$ = | 1.08672E-01 | -8.26106E-01 | -1.58101E+00 |
| $A_6$ = | -3.36500E+00 | -5.89047E-01 | 6.98520E+00 |
| $A_8$ = | 1.08331E+01 | 4.22252E-01 | 3.21500E+01 |
| $A_{10}$ = | -4.89049E+01 | -2.69764E+00 | -1.91360E+02 |
| $A_{12}$ = | 5.88533E+00 | 3.35890E+00 | 2.36149E+02 |
| $A_{14}$ = | -3.67348E+01 | -6.39001E+01 | 8.22089E+01 |
| $A_{16}$ = | -2.02297E+01 | -5.30938E+01 | -2.64909E+01 |

TABLE 11-2-continued

Aspheric Coefficients

| | Surface# | | |
|---|---|---|---|
| | 5 | 6 | 7 |
| k = | -1.63797E+00 | 2.33802E+00 | 2.58739E-01 |
| $A_4$ = | 1.00491E-01 | -6.16755E-01 | -4.26777E-01 |
| $A_6$ = | 5.18455E-01 | 1.01421E+00 | 3.23880E-01 |
| $A_8$ = | 1.06872E+01 | -8.82150E-01 | -2.32555E-01 |
| $A_{10}$ = | 2.03154E+01 | 4.27718E-01 | 7.99073E-02 |
| $A_{12}$ = | -1.72414E+02 | -8.52620E-02 | -2.84383E-04 |
| $A_{14}$ = | 2.38896E+02 | -2.44353E-01 | -5.99783E-03 |
| $A_{16}$ = | -6.21334E+01 | 2.53656E-01 | -7.84183E-04 |

The content of Table 11-3 may be deduced from Table 11-1.

TABLE 11-3

| Embodiment 11 | | | |
|---|---|---|---|
| f (mm) | 2.10 | $(R_3 + R_4)/(R_3 - R_4)$ | -5.88 |
| Fno | 2.80 | $R_6/f$ | 1.13 |
| HFOV(deg.) | 33.4 | TD (mm) | 2.00 |
| $V_2$ | 23.3 | $f_1/f_3$ | -0.04 |
| $CT_{max}$ (mm) | 0.86 | $\Sigma CT$ (mm) | 1.56 |
| $CT_{min}$ (mm) | 0.28 | SL/TTL | 0.99 |
| $(R_1 + R_2)/(R_1 - R_2)$ | -0.08 | — | — |

It is to be noted that TABLES 1-11 show different data of the different embodiments, however, the data of the different embodiments are obtained from experiments. Therefore, any capturing lens system of the same structure is considered to be within the scope of the present disclosure even if it uses different data. The embodiments depicted above and the appended drawings are exemplary and are not intended to limit the scope of the present disclosure.

What is claimed is:

1. A photographing lens system comprising, in order from an object side to an image side:

a first lens element with positive refractive power comprising a convex object-side surface and a convex image-side surface, and the object-side surface and the image-side surface being aspheric;

a second lens element with negative refractive power comprising a concave object-side surface and a convex image-side surface, the second lens element being made of plastic and the object-side surface and the image-side surface being aspheric; and a third lens element with negative refractive power comprising an object-side surface and a concave image-side surface, the third lens element being made of plastic, the object-side surface and the image-side surface being aspheric, wherein the image-side surface is concave near an optical axis and convex away from the optical axis;

the photographing lens system satisfying the following condition:

$-0.15<(R_1+R_2)/(R_1-R_2)<1.00$; and $0.70 \text{ mm}<\Sigma CT<1.56 \text{ mm}$;

wherein $R_1$ is the curvature radius of the object-side surface of the first lens element, $R_2$ is the curvature radius of the image-side surface of the first lens element and $\Sigma CT$ is the total central thickness of the lens elements with refractive powers; and wherein the total number of the lens elements with refractive powers is three.

2. The photographing lens system according to claim 1, wherein the object-side surface of the third lens element is convex.

3. The photographing lens system according to claim 2, wherein the photographing lens system satisfies the following condition:

$-10.0<(R_3+R_4)/(R_3-R_4)<-4.5$;

wherein $R_3$ is the curvature radius of the object-side surface of the second lens element, and $R_4$ is the curvature radius of the image-side surface of the second lens element.

4. The photographing lens system according to claim 3, wherein the photographing lens system satisfies the following condition:

$-0.20<f_1/f_3<-0.01$;

wherein $f_1$ is the focal length of the first lens element, and $f_3$ is the focal length of the third lens element.

5. The photographing lens system according to claim 2, wherein the photographing lens system satisfies the following condition:

$0.25 \text{ mm}<CT_{max}<0.90 \text{ mm}$;

wherein $CT_{max}$ is the largest central thickness among the first lens element, the second lens element and the third lens element.

6. The photographing lens system according to claim 5, wherein the photographing lens system satisfies the following condition:

$10<V_2<24$;

wherein $V_2$ is the Abbe number of the second lens element.

7. The photographing lens system according to claim 5, wherein the photographing lens system satisfies the following condition:

$0.15 \text{ mm}<CT_{min}<0.38 \text{ mm}$;

wherein $CT_{min}$ is the smallest central thickness among the first lens element, the second lens element and the third lens element.

8. The photographing lens system according to claim 2, wherein the photographing lens system satisfies the following condition:

$0\leq(R_1+R_2)/(R_1-R_2)<0.90$;

wherein $R_1$ is the curvature radius of the object-side surface of the first lens element, and $R_2$ is the curvature radius of the image-side surface of the first lens element.

9. The photographing lens system according to claim 8, wherein the central thickness of the second lens element is less than the central thickness of the first lens element, and the central thickness of the second lens element is less than the central thickness of the third lens element.

10. The photographing lens system according to claim 9, wherein the photographing lens system comprises a stop and an image plane and the photographing lens system satisfies the following condition:

$0.70<SL/TTL<1.02$;

wherein SL is the axial distance between the stop and the image plane, and TTL is the axial distance between the object-side surface of the first lens element and the image plane.

11. The photographing lens system according to claim 9, wherein the photographing lens system satisfies the following condition:

$0.56<R_6/f<1.30$;

wherein $R_6$ is the curvature radius of the image-side surface of the third lens element, and f is the focal length of the photographing lens system.

12. The photographing lens system according to claim 2, wherein the photographing lens system satisfies the following condition:

$0.8 \text{ mm}<TD<2.4 \text{ mm}$;

wherein TD is the axial distance between the object-surface side of the first lens element and the image-side surface of the third lens element.

13. A photographing lens system comprising, in order from an object side to an image side:

a first lens element with positive refractive power comprising a convex object-side surface and a convex image-side surface, and the object-side surface and the image-side surface being aspheric;

a second lens element with negative refractive power comprising a concave object-side surface and a convex image-side surface, the second lens element being made of plastic, and the object-side surface and the image-side surface being aspheric; and a third lens element with negative refractive power comprising a convex object-side surface and a concave image-side surface, the third lens element being made of plastic, the object-side surface and the image-side surface being aspheric, wherein the image-side surface is concave near an optical axis and convex away from the optical axis;

the photographing lens system satisfying the following condition:

$-0.15<(R_1+R_2)/(R_1-R_2)<1.00$; and $0.15 \text{ mm}<CT_{min}<0.38 \text{ mm}$;

wherein $R_1$ is the curvature radius of the object-side surface of the first lens element, $R_2$ is the curvature radius of the image-side surface of the first lens element, and $CT_{min}$ is the smallest central thickness among the first lens element, the second lens element and the third lens element; and wherein the total number of the lens elements with refractive powers is three.

14. The photographing lens system according to claim 13, wherein the photographing lens system satisfies the following condition:

$$0.25\ mm < CT_{max} < 0.90\ mm;$$

wherein $CT_{max}$ is the largest central thickness among the first lens element, the second lens element and the third lens element.

15. The photographing lens system according to claim 14, wherein the central thickness of the second lens element is less than the central thickness of the first lens element, and the central thickness of the second lens element is less than the central thickness of the third lens element.

16. The photographing lens system according to claim 14, wherein the photographing lens system satisfies the following condition:

$$0 \le (R_1+R_2)/(R_1-R_2) < 0.90;$$

wherein $R_1$ is the curvature radius of the object-side surface of the first lens element, and $R_2$ is the curvature radius of the image-side surface of the first lens element.

17. The photographing lens system according to claim 14, wherein the photographing lens system comprises a stop and an image plane and the photographing lens system satisfies the following condition:

$$0.70 < SL/TTL < 0.90;$$

wherein SL is the axial distance between the stop and the image plane, and TTL is the axial distance between the object-side surface of the first lens element and the image plane.

18. The photographing lens system according to claim 17, wherein the photographing lens system satisfies the following condition:

$$-10.0 < (R_3+R_4)/(R_3-R_4) < -4.5;$$

wherein $R_3$ is the curvature radius of the object-side surface of the second lens element, and $R_4$ is the curvature radius of the image-side surface of the second lens element.

19. The photographing lens system according to claim 17, wherein the photographing lens system satisfies the following condition:

$$-0.20 < f_1/f_3 < -0.01;$$

wherein $f_1$ is the focal length of the first lens element, and $f_3$ is the focal length of the third lens element.

20. The photographing lens system according to claim 13, wherein the photographing lens system satisfies the following condition:

$$10 < V_2 < 24;$$

wherein $V_2$ is the Abbe number of the second lens element.

21. The photographing lens system according to claim 13, wherein the photographing lens system satisfies the following condition:

$$0.15\ mm < CT_{min} < 0.32\ mm;$$

wherein $CT_{min}$ is the smallest central thickness among the first lens element, the second lens element and the third lens element.

* * * * *